United States Patent
Pattan et al.

(10) Patent No.: US 10,440,529 B2
(45) Date of Patent: Oct. 8, 2019

(54) METHOD AND SYSTEM OF RESPONDING TO A CALL WITH A REAL TIME TEXT

(71) Applicant: Samsung Electronics Co., Ltd., Suwon-si, Gyeonggi-do (KR)

(72) Inventors: Basavaraj Jayawant Pattan, Bangalore (IN); Ashok Kumar Selvaraj, Pondicherry (IN); Kyungtak Lee, Yongin-si (KR); Nishant Gupta, Sitapur (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/316,391

(22) PCT Filed: Jun. 3, 2015

(86) PCT No.: PCT/KR2015/005587
§ 371 (c)(1),
(2) Date: Dec. 5, 2016

(87) PCT Pub. No.: WO2015/186973
PCT Pub. Date: Dec. 10, 2015

(65) Prior Publication Data
US 2017/0201873 A1    Jul. 13, 2017

(30) Foreign Application Priority Data

Jun. 3, 2014   (IN) .......................... 2720/CHE/2014
May 29, 2015  (IN) .......................... 2720 /CHE/2014

(51) Int. Cl.
*H04W 4/16*   (2009.01)
*H04W 4/14*   (2009.01)
(Continued)

(52) U.S. Cl.
CPC .............. *H04W 4/16* (2013.01); *H04L 51/04* (2013.01); *H04W 4/14* (2013.01);
(Continued)

(58) Field of Classification Search
CPC .......... H04W 4/22; H04W 4/14; H04W 4/16; H04W 76/007; H04W 92/18; H04W 4/12;
(Continued)

(56) References Cited

U.S. PATENT DOCUMENTS 6,941,345 B1 *   9/2005   Kapil .................. H04L 12/1818
                                                  709/206
8,509,408 B2 *   8/2013   Goodman ........... H04M 7/0042
                                                  379/201.01
(Continued)

FOREIGN PATENT DOCUMENTS

KR   10-2010-0020364 A   2/2010
KR   10-2014-0060995 A   5/2014
WO       2014/021546 A1   2/2014

OTHER PUBLICATIONS

Indian Office Action dated Feb. 5, 2019, issued in Indian Application No. 2720/CHE/2014.

*Primary Examiner* — Olumide Ajibade Akonai
(74) *Attorney, Agent, or Firm* — Jefferson IP Law, LLP

(57) ABSTRACT

Embodiments herein provide a method and system of responding to a call with a text. The method includes receiving by a target communication device a call from an initiator communication device. The target communication device responds to the from call with a real time text (RTT). One or more characters in the RTT are sent instantaneously to the initiator communication device.

19 Claims, 16 Drawing Sheets

(51) Int. Cl.
  *H04L 12/58* (2006.01)
  *H04M 3/51* (2006.01)
  *H04M 3/533* (2006.01)
  *H04M 3/42* (2006.01)
  *H04M 1/725* (2006.01)
  *H04M 3/428* (2006.01)
  *H04L 12/18* (2006.01)

(52) U.S. Cl.
  CPC .......... *H04L 12/1895* (2013.01); *H04L 51/24* (2013.01); *H04L 51/38* (2013.01); *H04M 1/72552* (2013.01); *H04M 3/42059* (2013.01); *H04M 3/4288* (2013.01); *H04M 3/5116* (2013.01); *H04M 3/5335* (2013.01); *H04M 3/53333* (2013.01)

(58) Field of Classification Search
  CPC ........ H04W 68/00; H04L 51/04; H04L 51/38; H04L 51/02; H04L 65/1016; H04L 12/1895; H04L 51/24; H04M 1/72536; H04M 3/42382; H04M 2242/04; H04M 1/72552; H04M 3/42059; H04M 3/5116; H04M 3/53333; H04M 3/5335; H04M 3/2281; H04M 3/42221; H04M 3/2218; H04M 3/436; H04M 2203/651; H04M 3/42093; H04M 3/5232; H04M 3/22183; H04M 3/4288
  See application file for complete search history.

(56) References Cited

U.S. PATENT DOCUMENTS

| | | | | |
|---|---|---|---|---|
| 9,351,133 | B2* | 5/2016 | Offen | H04M 3/42059 |
| 2009/0088168 | A1* | 4/2009 | Varanasi | H04M 1/663 |
| | | | | 455/445 |
| 2011/0111735 | A1* | 5/2011 | Pietrow | H04M 1/642 |
| | | | | 455/414.1 |
| 2011/0238734 | A1* | 9/2011 | Curry | H04L 51/38 |
| | | | | 709/203 |
| 2011/0258266 | A1* | 10/2011 | Serra | H04M 3/5116 |
| | | | | 709/206 |
| 2012/0034897 | A1 | 2/2012 | Kreitzer et al. | |
| 2012/0034938 | A1* | 2/2012 | Kreitzer | H04L 51/04 |
| | | | | 455/466 |
| 2013/0165068 | A1 | 6/2013 | Keller et al. | |
| 2014/0057610 | A1 | 2/2014 | Olincy et al. | |
| 2014/0134983 | A1 | 5/2014 | Jung et al. | |
| 2015/0017957 | A1* | 1/2015 | Gorti | H04M 19/041 |
| | | | | 455/414.1 |
| 2015/0117444 | A1* | 4/2015 | Sandblad | H04L 65/1059 |
| | | | | 370/352 |

* cited by examiner

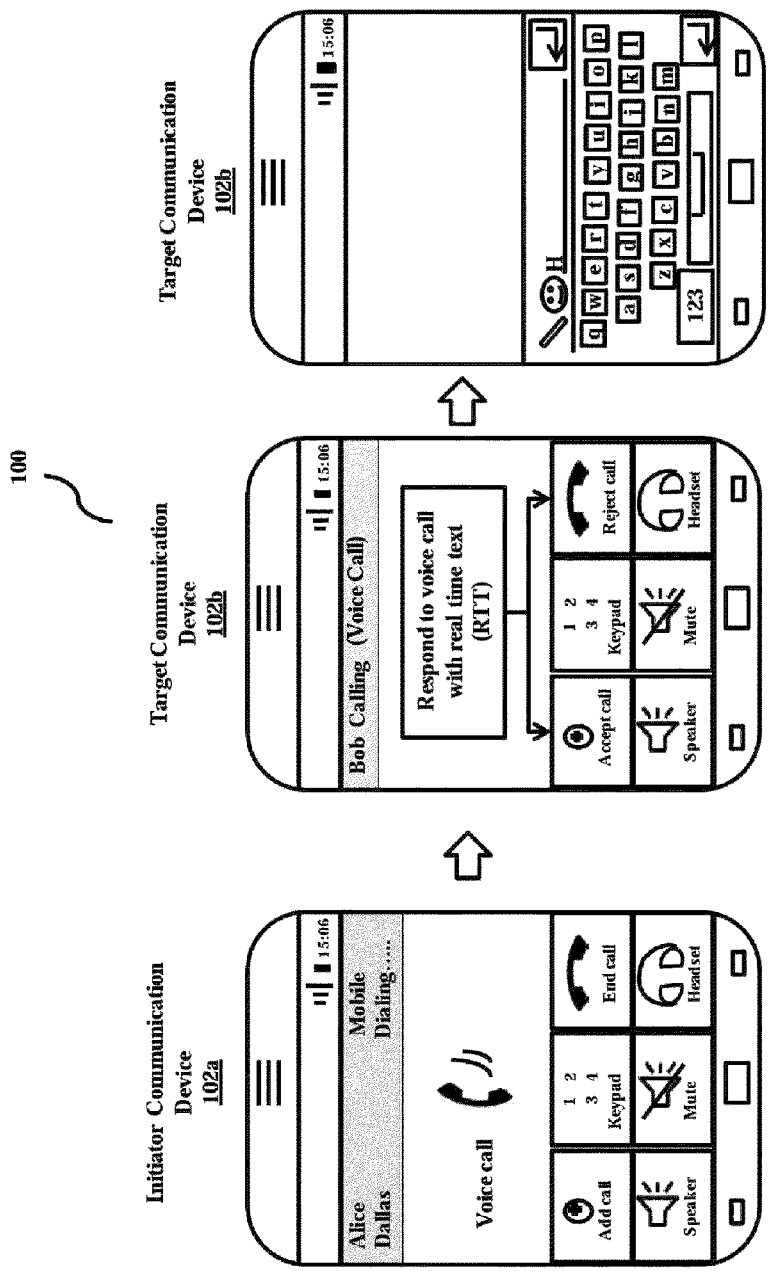
[Fig. 1a]

[Fig. 1b]
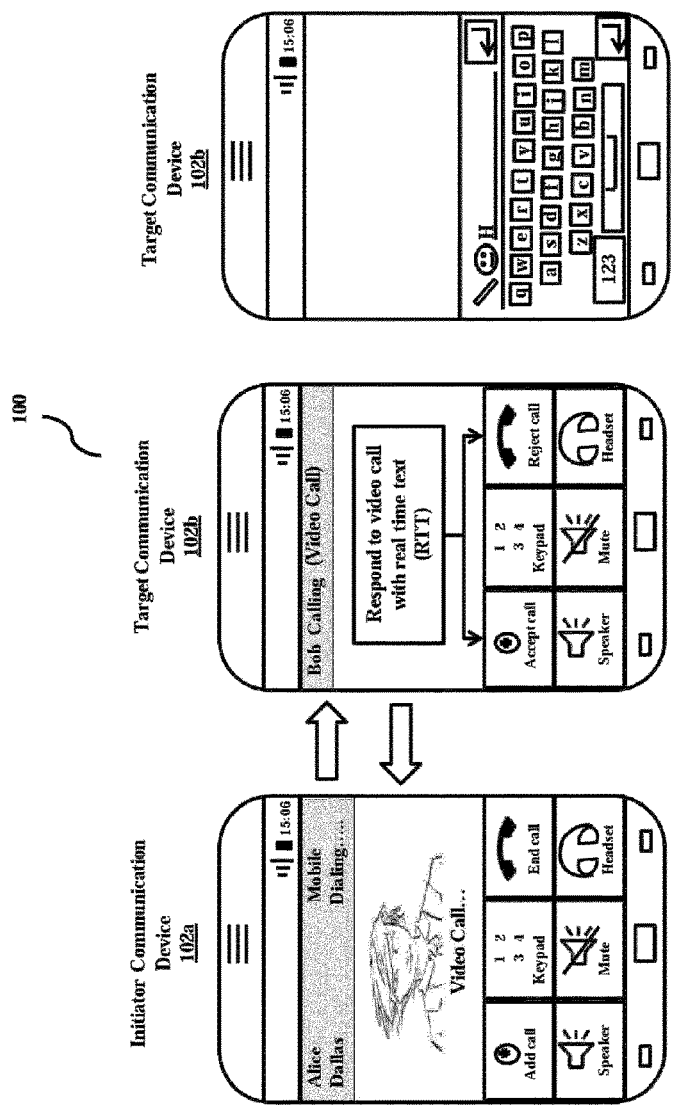
[Fig. 2a]
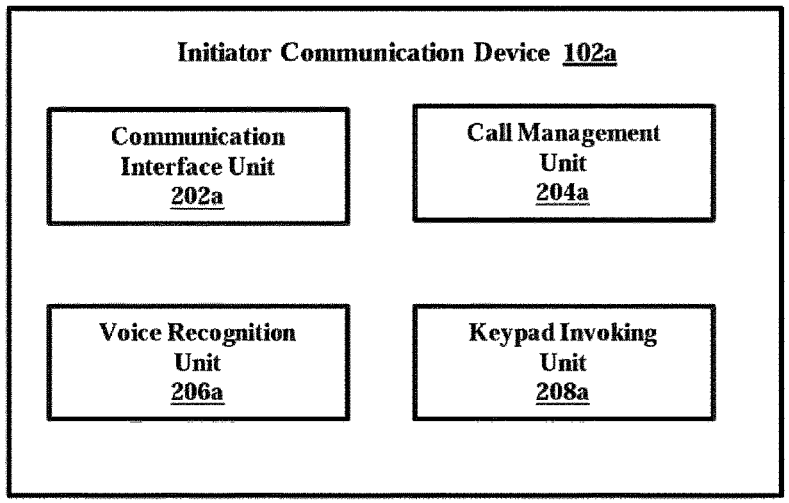

[Fig. 2b]
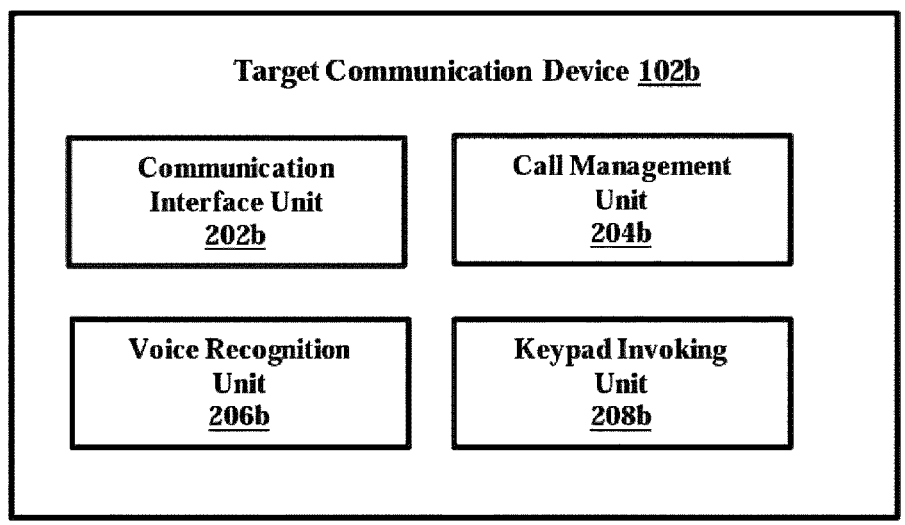

[Fig. 3]
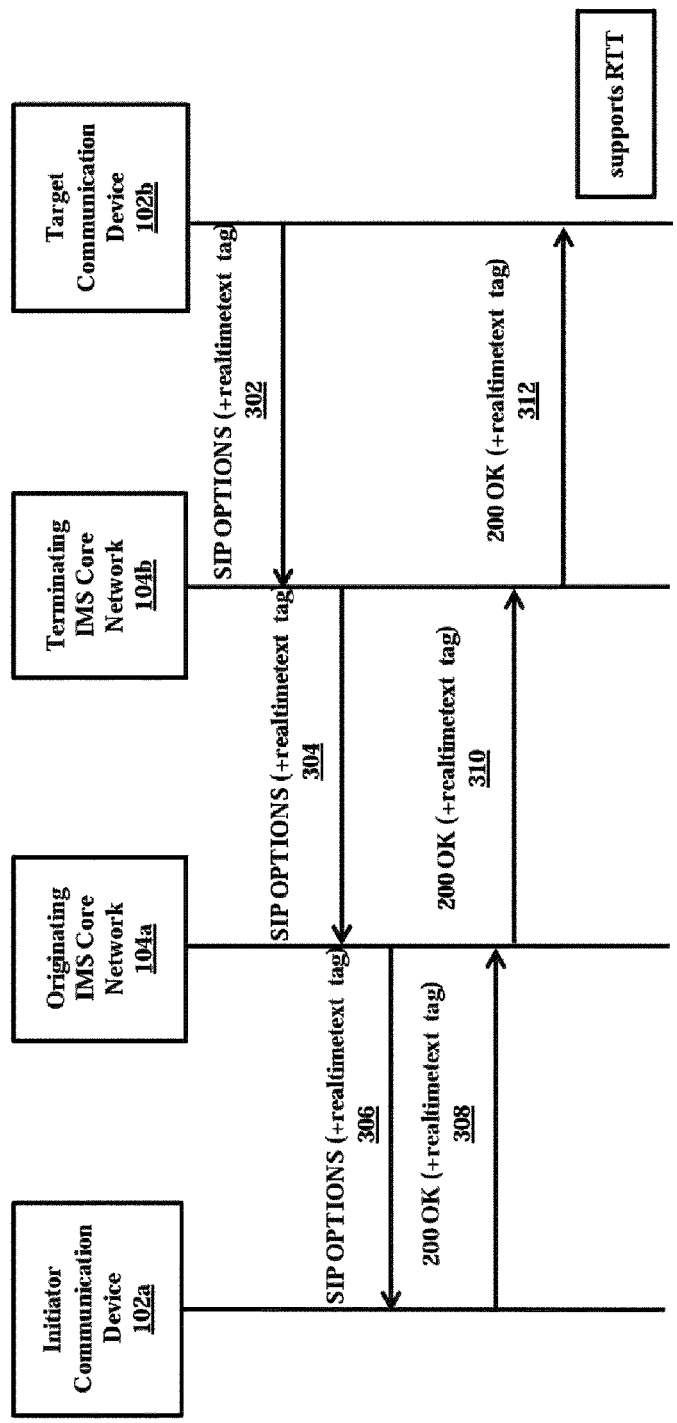

[Fig. 4]
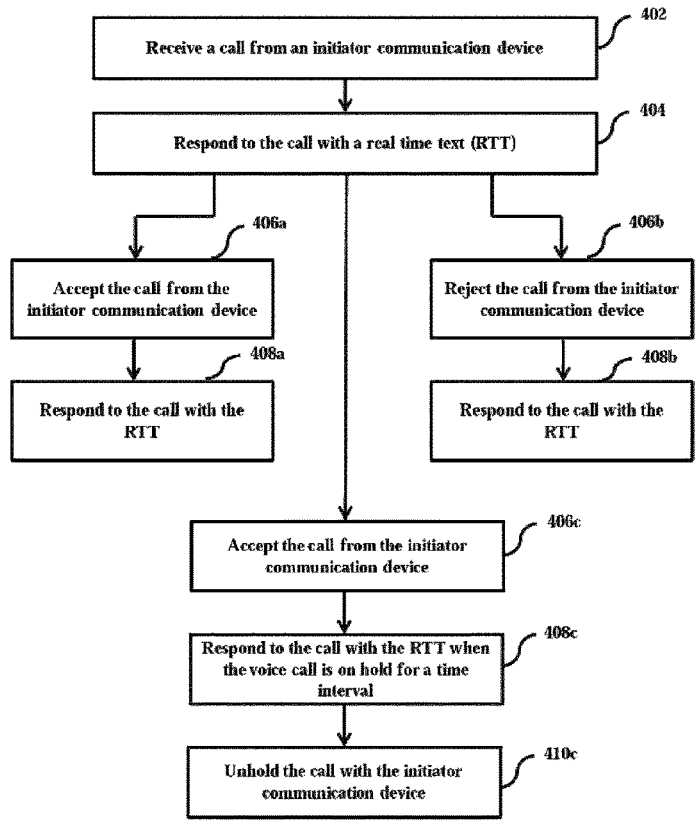
[Fig. 5]
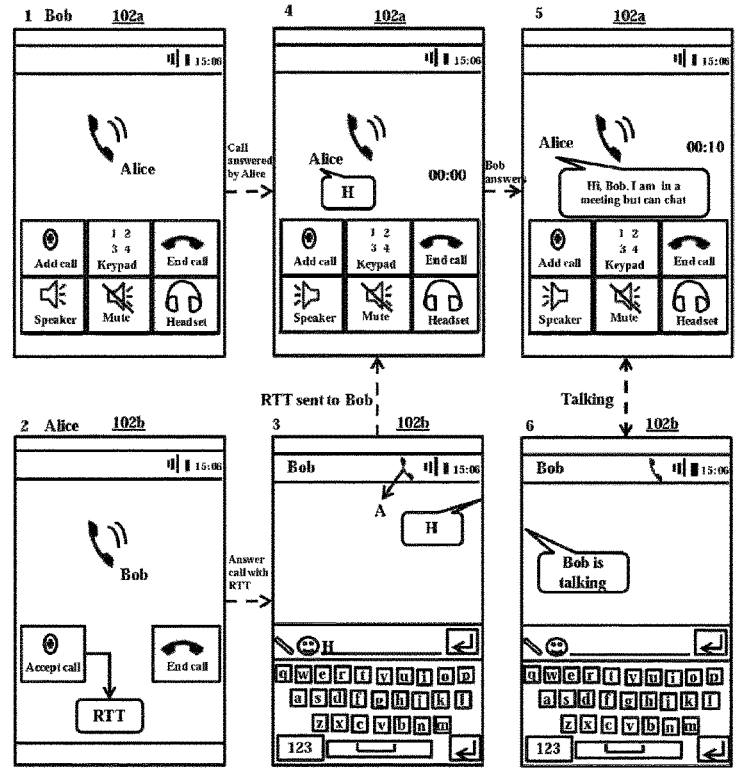

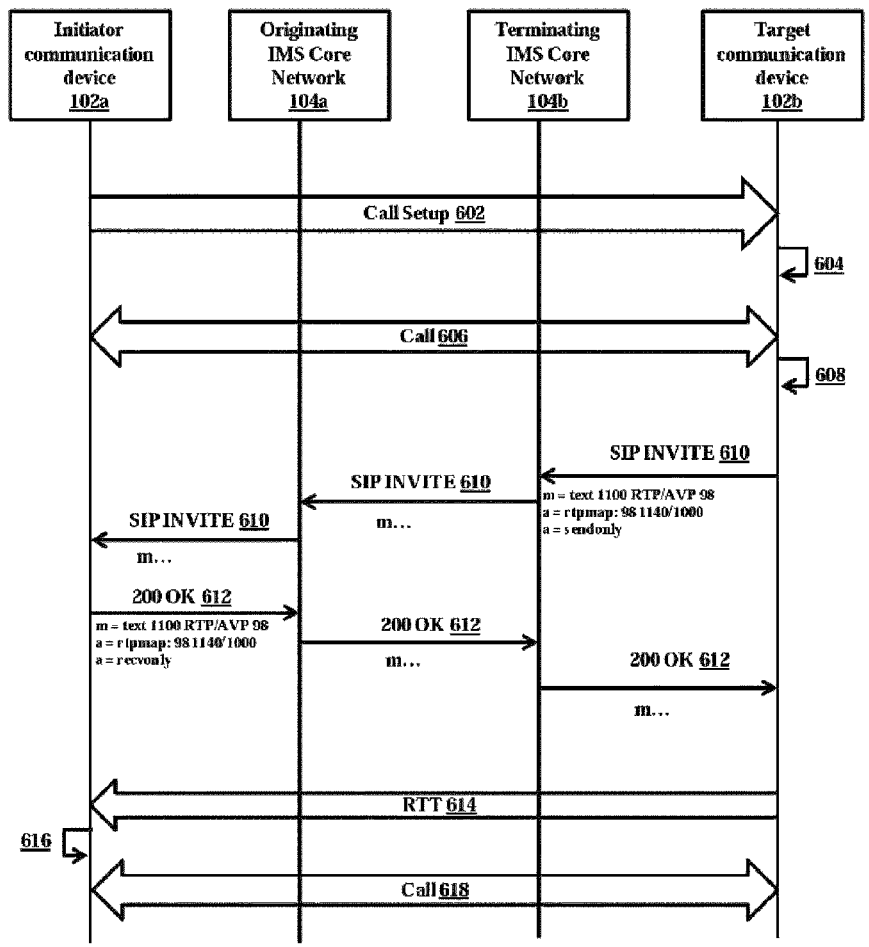
[Fig. 6]

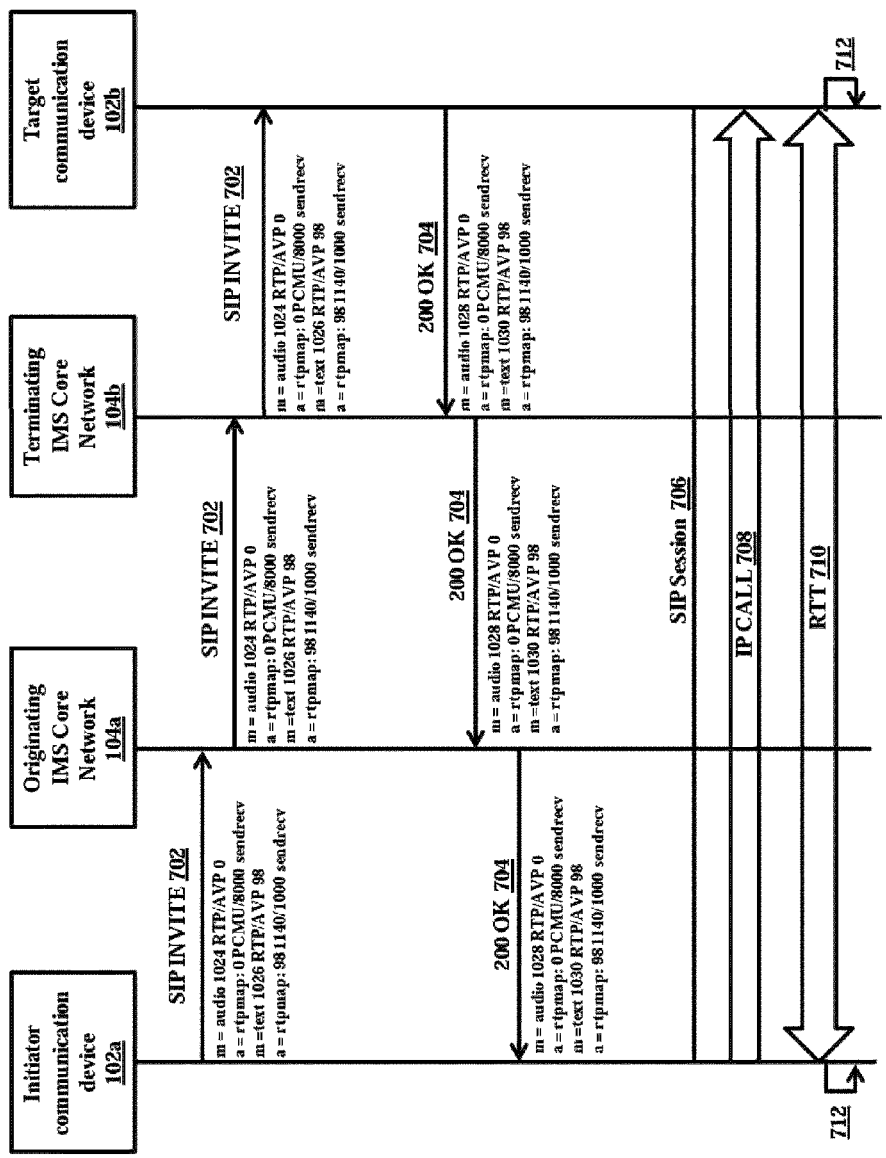
[Fig. 7]

[Fig. 8]
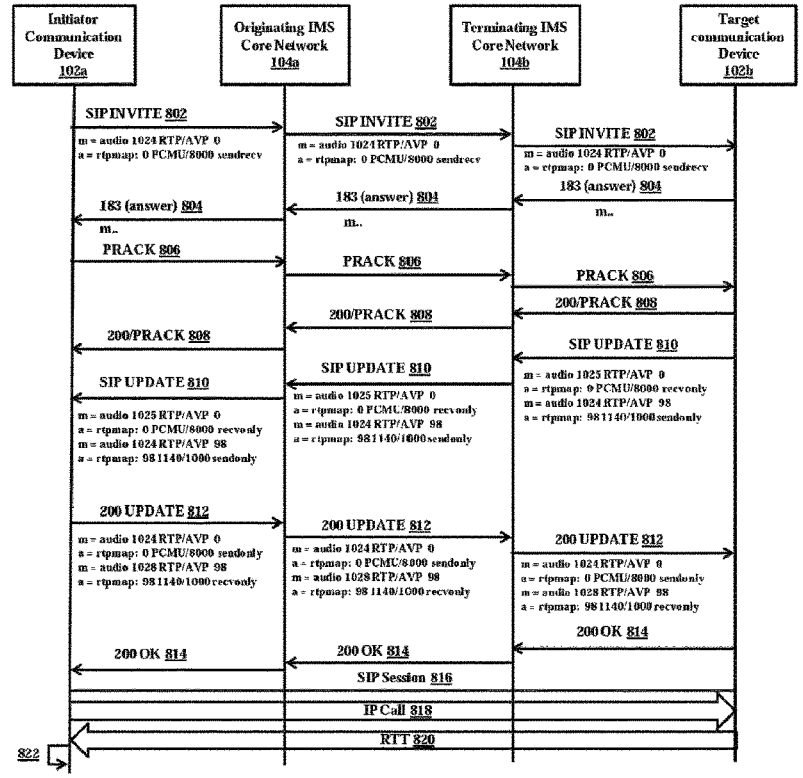
[Fig. 9]
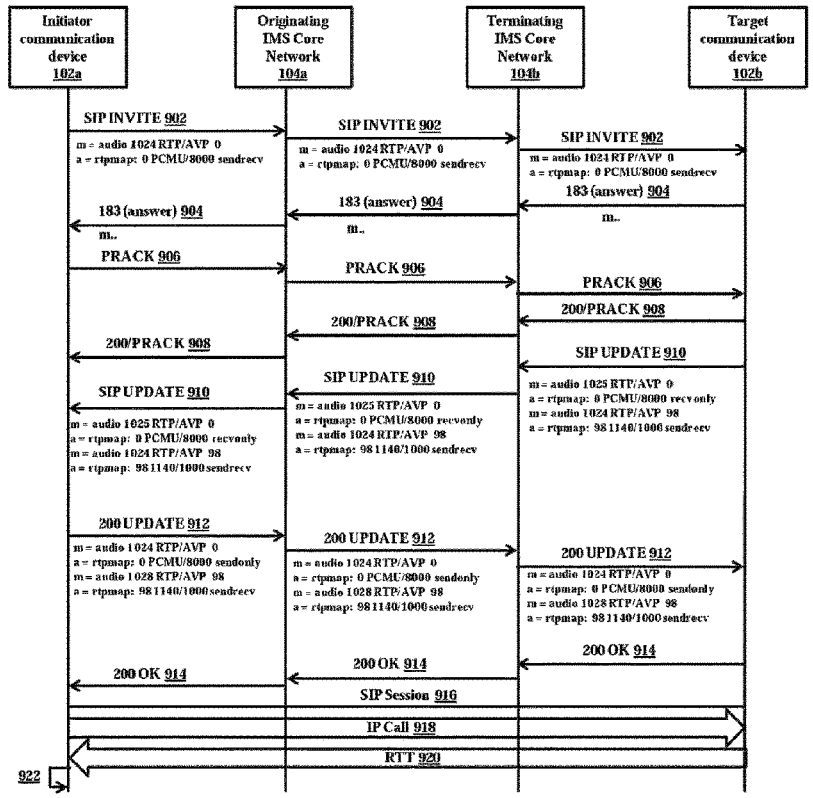

[Fig. 10]
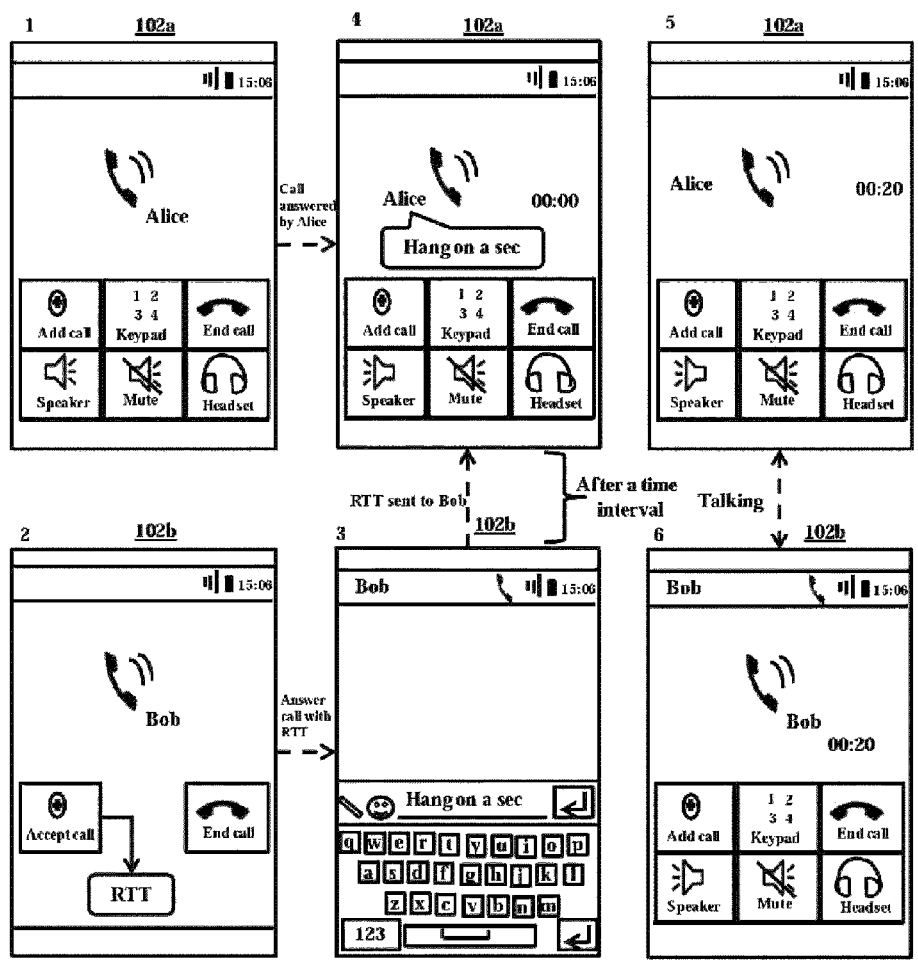

[Fig. 11]
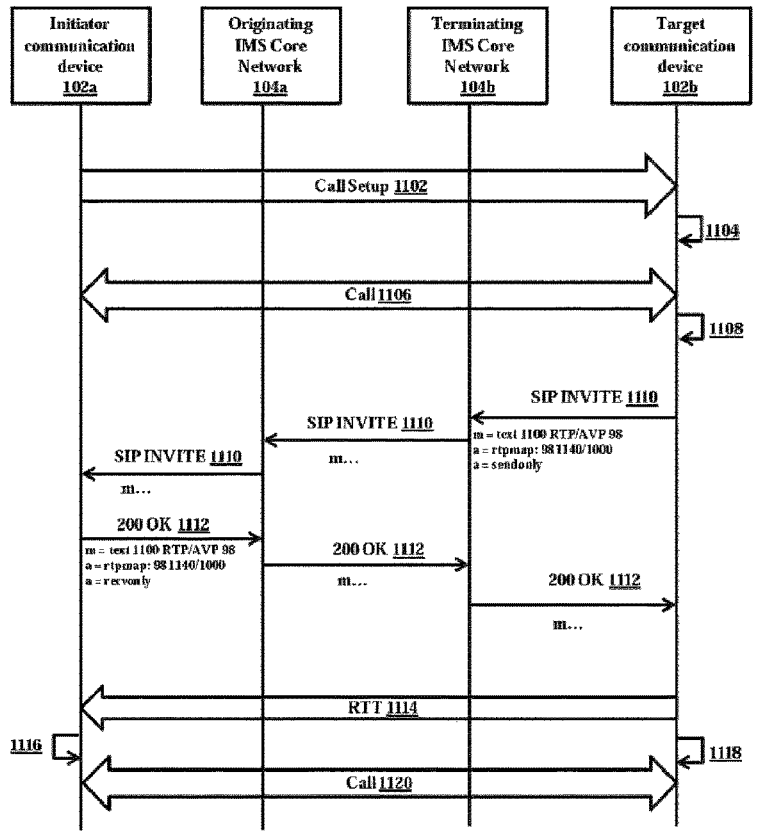
[Fig. 12]
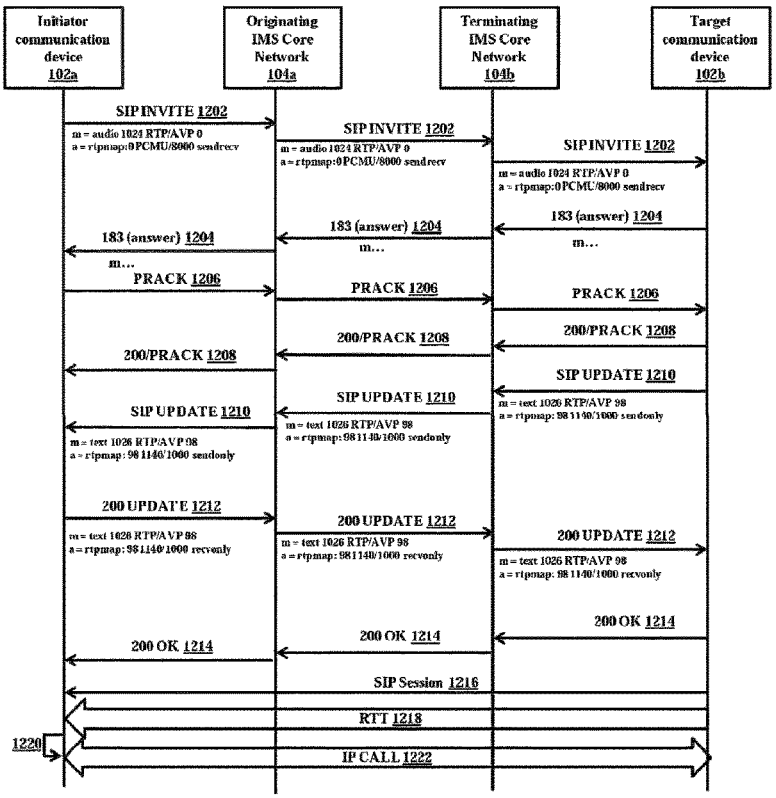

[Fig. 13]
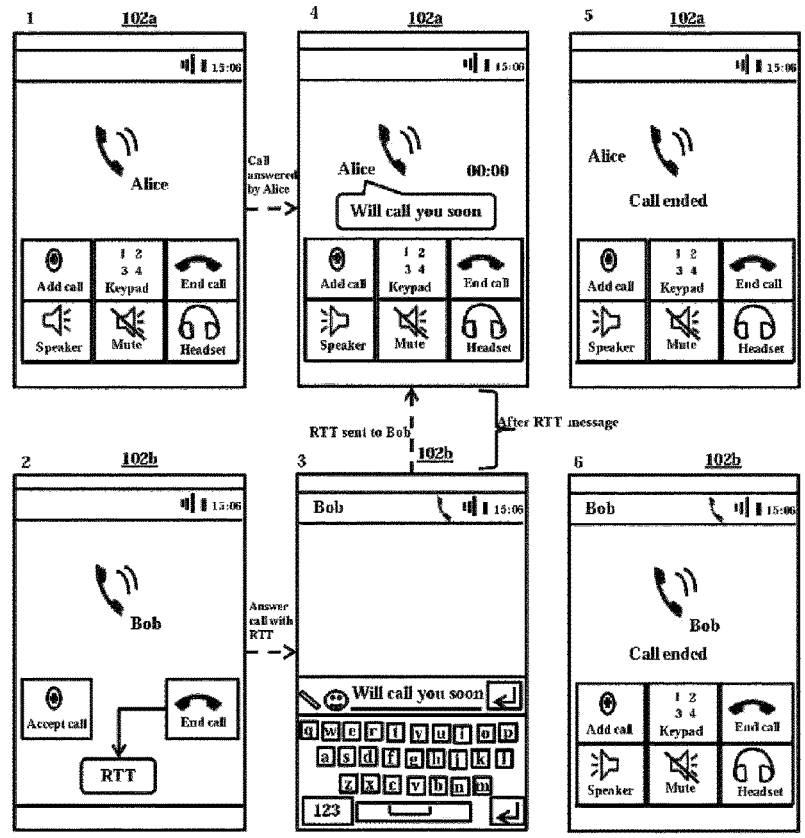
[Fig. 14]
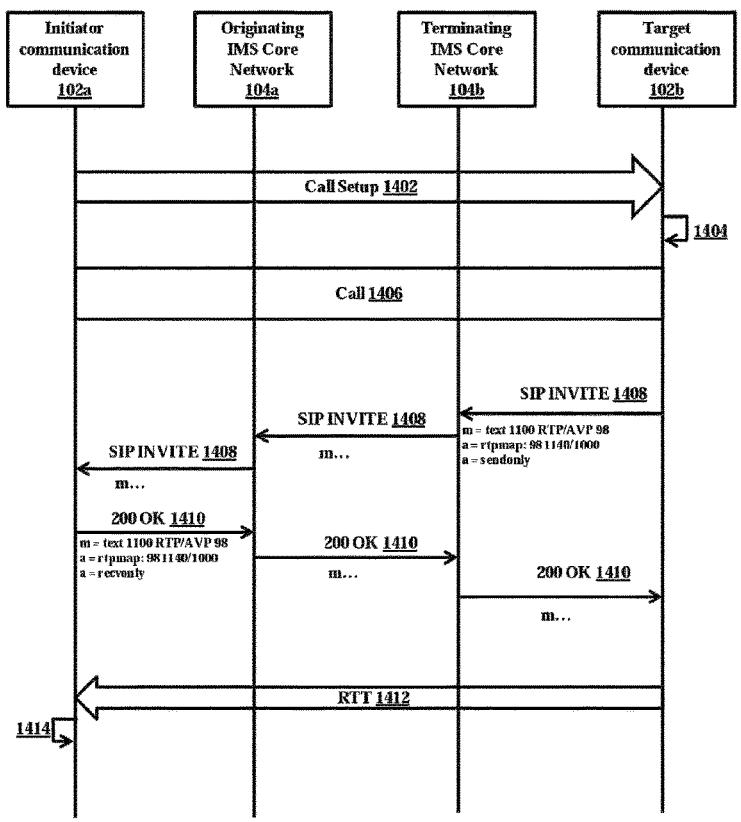

[Fig. 15]
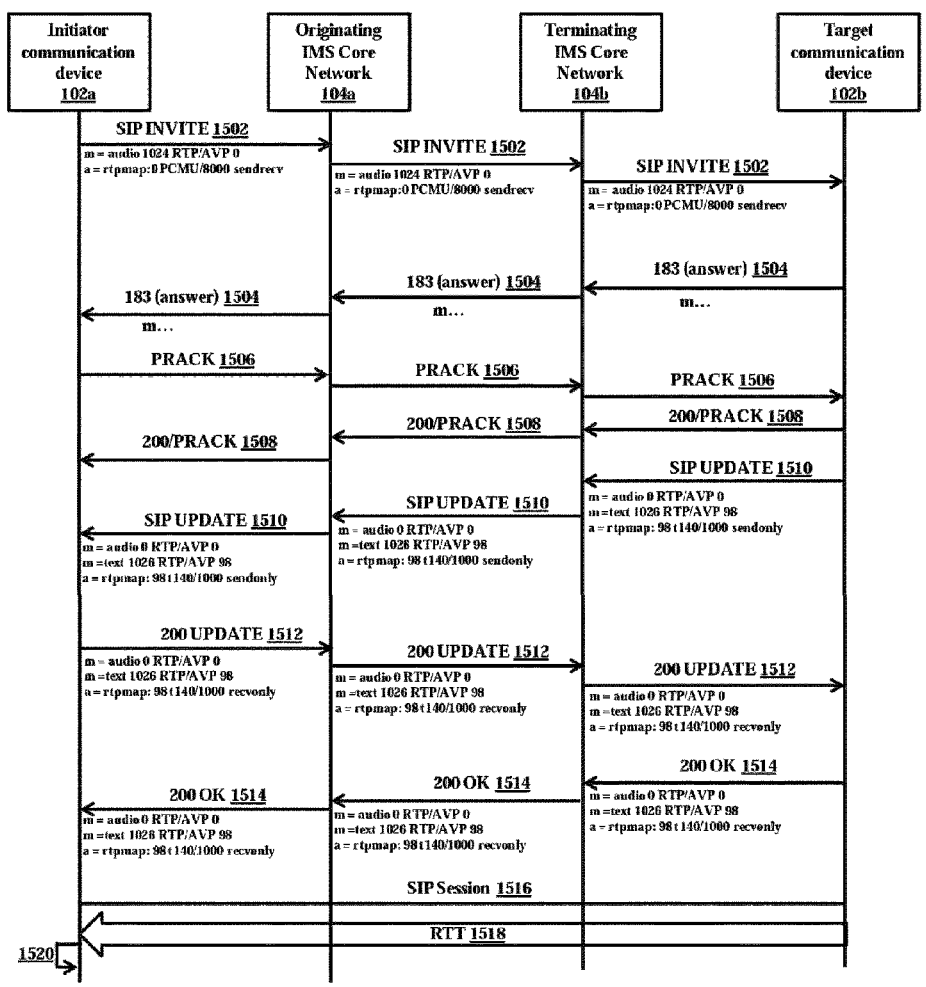

[Fig. 16]
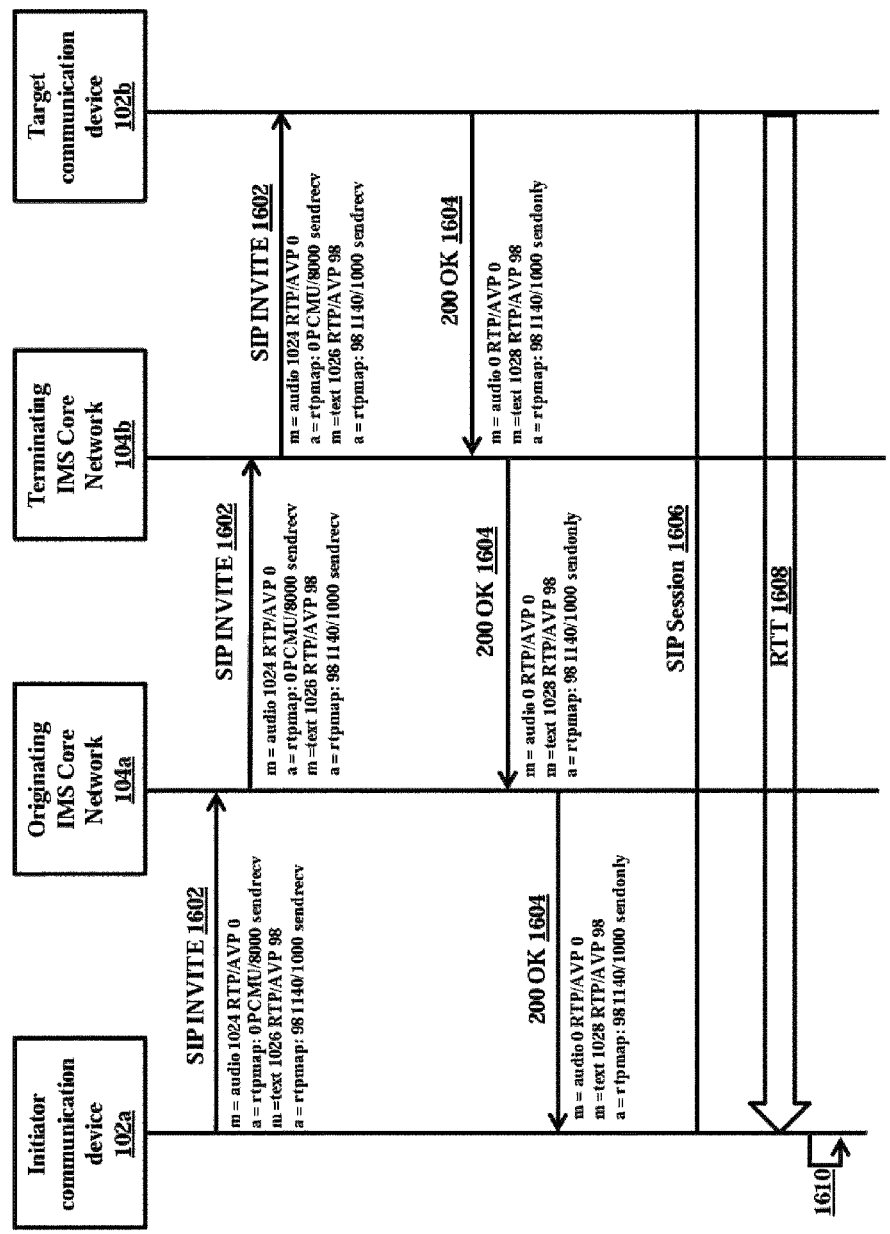

[Fig. 17]
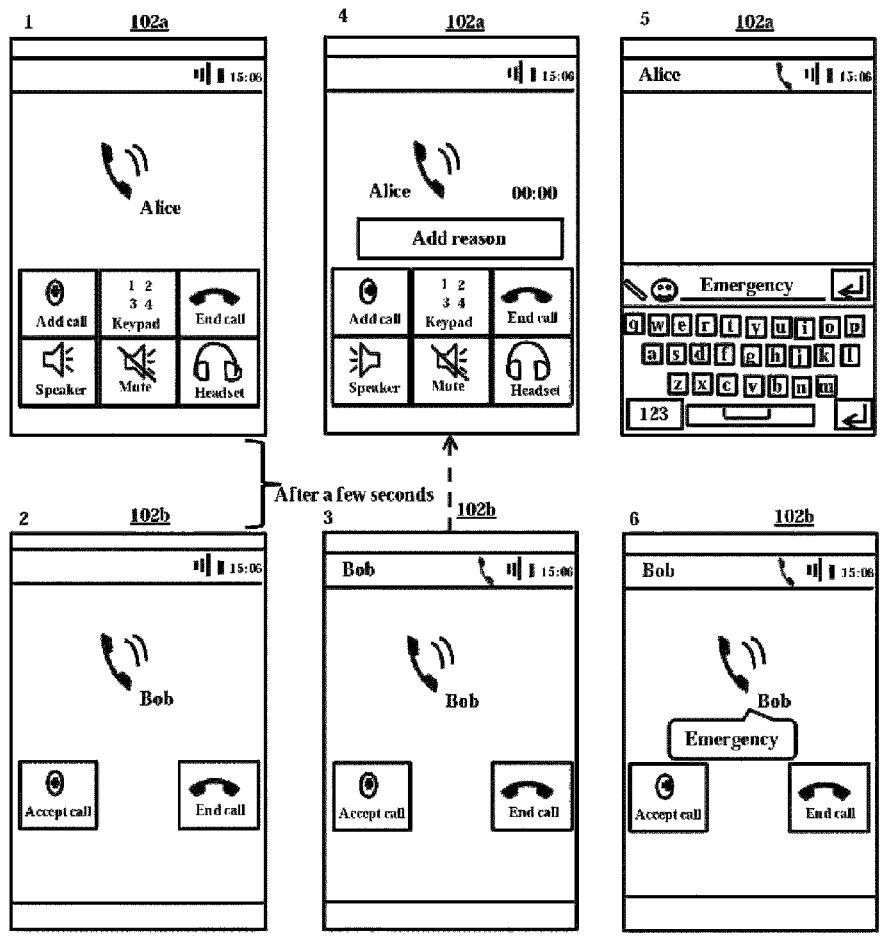

[Fig. 18]
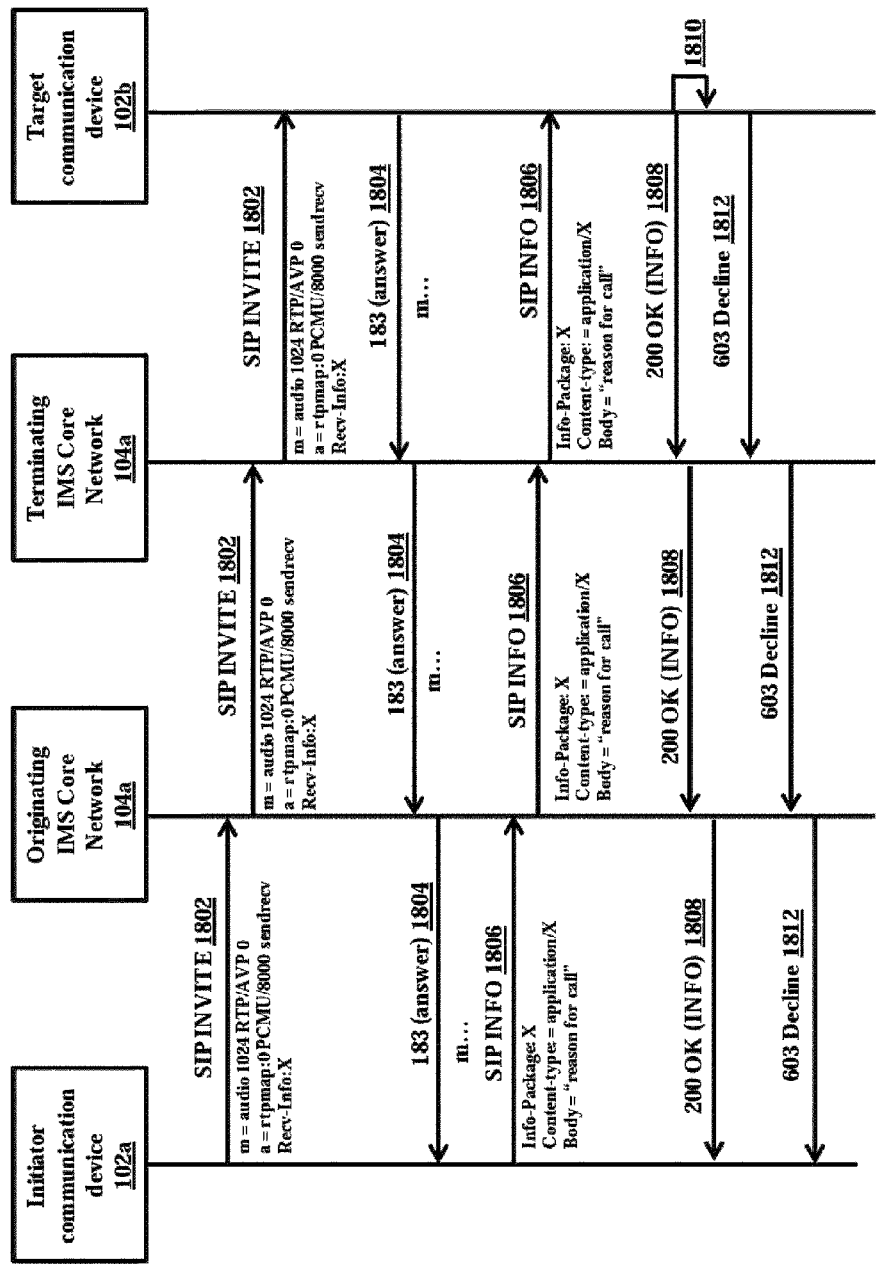

[Fig. 19]
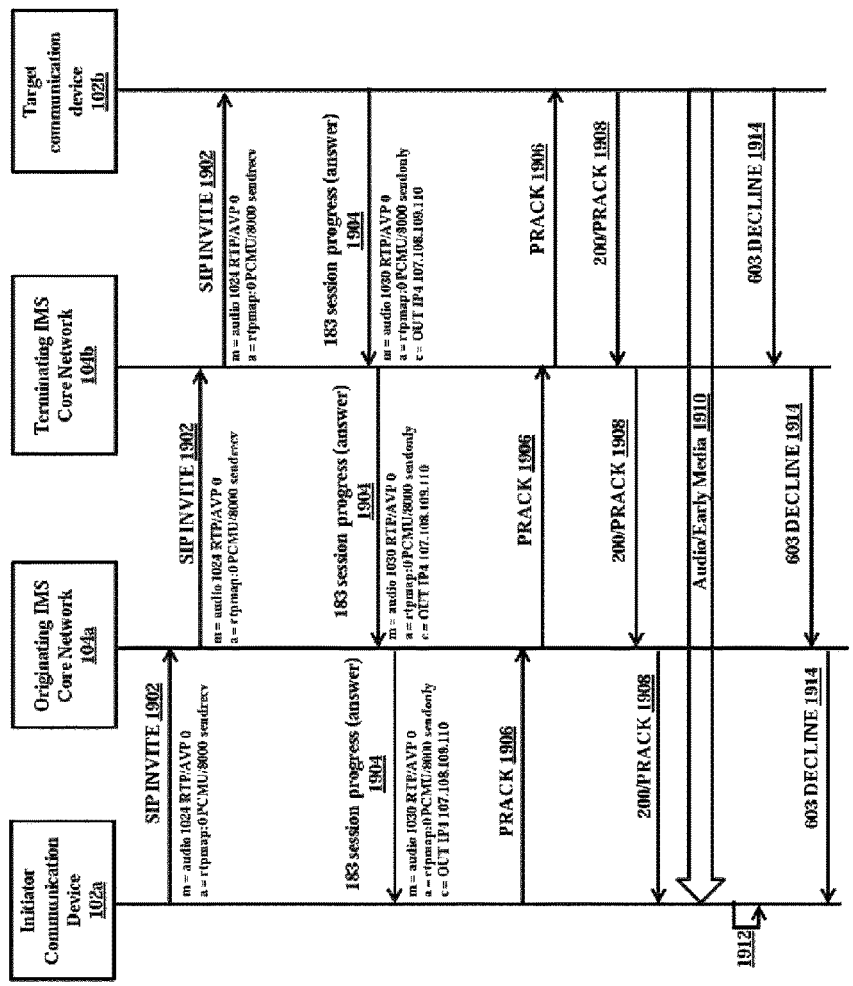
[Fig. 20]
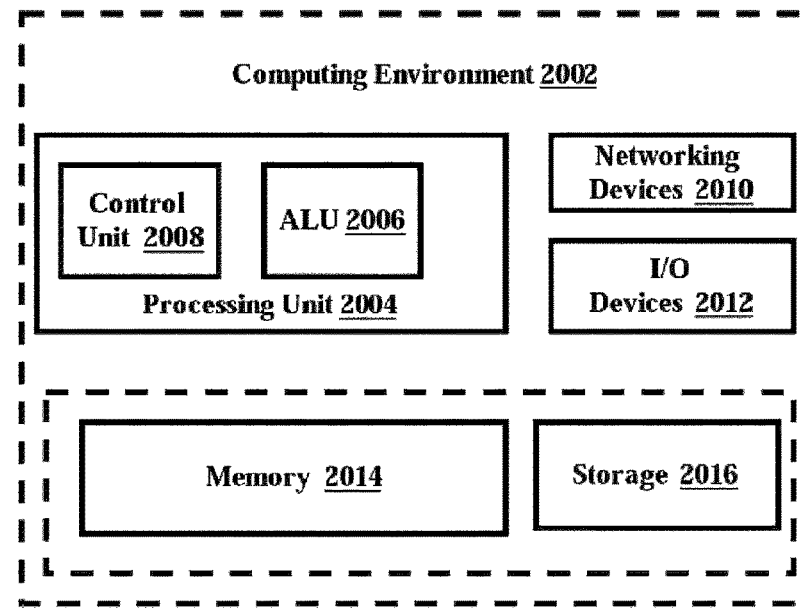

METHOD AND SYSTEM OF RESPONDING TO A CALL WITH A REAL TIME TEXT

TECHNICAL FIELD

The embodiments herein relate to handling a call and more particularly relates to a mechanism for responding to a call with a real time text (RTT). The present application is based on, and claims priority from an Indian Application Number 2720/CHE/2014 filed on 3 Jun. 2014, the disclosure of which is hereby incorporated by reference herein.

BACKGROUND ART

Communication devices allow users to communicate with each other over a call or with a text message. When a user calls to another user (recipient user) from the communication device, the recipient user may accept the call, reject the call or reject the call by sending a short message service (SMS). The call experience to the recipient user has not changed over several years.

Further, text messaging application in communication devices allows users to communicate with each other in an efficient and convenient manner. With the prevalence of text messaging application in communication devices users are interested to communicate with one another through text messaging applications.

In present day scenarios, users may not be able to accept the call but they may wish to send text messages as a response to the call instead of verbal communication. However in existing systems, the users can accept the call, reject the call or reject the call with the SMS.

Currently, Open Mobile Alliance (OMA) has identified requirements for an Enhanced Visual Call (EVC) enabler. The EVC enabler includes requirements related to enhancing the calling experience with new features in order to provide a rich user experience while initiating a call, during the call, and after placing the call. Thus, there remains a need of robust and mechanism for providing advanced service for a user to enhance calling experience.

DISCLOSURE OF INVENTION

Technical Problem

The principal object of the embodiments herein is to provide a mechanism of responding to a call with a real time text (RTT).

Another object of the embodiments herein is to provide a mechanism of responding to the call with the RTT after accepting the call.

Another object of the embodiments herein is to provide a mechanism of responding to the call with the RTT for rejecting the call.

Another object of the embodiments herein is to provide a mechanism of responding to the call with the RTT by holding the call for a time interval.

Another object of the embodiments herein is to provide a mechanism of including a RTT while initiating a call.

Solution to Problem

Accordingly the embodiments herein provide a method of responding to a voice call with a text, the method includes receiving by a target communication device a call from an initiator communication device. Further, the method includes responding by the target communication device to the call with a real time text (RTT). The one or more characters in the RTT are sent instantaneously to the initiator communication device.

Accordingly the embodiments herein provide a system that includes an initiator communication device and a terminating communication device. The initiator communication device is configured to initiate a call to a target communication device. The target communication device is configured to receive the call from the initiator communication device. Further, the target communication device is configured to respond to the call with a real time text (RTT). The one or more characters in the RTT are sent instantaneously to the initiator communication device.

Accordingly the embodiments herein provide a communication device. The communication device is configured to receive a call from an initiator communication device. Further, the communication device is configured to respond to the call with a real time text (RTT). The one or more characters in the RTT are sent instantaneously to the initiator communication device.

Accordingly the embodiments herein provide a communication device. The communication device is configured to initiate a call with a target communication device by including a real time text (RTT) in the call.

Accordingly the embodiments herein provide a computer program product comprising a computer executable program code recorded on a computer readable non-transitory storage medium, the computer executable program code when executed causing the actions including receiving by a target communication device a call from a target communication device. The computer executable program code when executed causing the further actions including responding by the target communication device to the call with a real time text (RTT). The one or more characters in the RTT are sent instantaneously to the initiator communication device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIGS. 1A and 1B illustrate a high level overview of a system for responding to a call with a real time text (RTT), according to embodiments as disclosed herein;

FIG. 2A illustrates a block diagram of an initiator communication device with various modules, according to the embodiments as disclosed herein;

FIG. 2B illustrates a block diagram of a target communication device with various modules, according to the embodiments as disclosed herein;

FIG. 3 is a sequence diagram in which the target communication device discovers support of the RTT in the initiator communication device, according to the embodiments as disclosed herein;

FIG. 4 is a flow diagram explaining a method of responding to the call with the RTT, according to the embodiments as disclosed herein;

FIG. 5 shows an example illustration in which a user of the target communication device responds to the voice call with the RTT after accepting the call, according to the embodiments as disclosed herein;

FIG. 6 is a sequence diagram in which the user of the target communication device sends the RTT to the initiator communication device for an incoming circuit switched (CS) call or packet switched (PS) call, according to the embodiments as disclosed herein;

FIG. 7 is a sequence diagram in which the initiator communication device and the target communication device exchange the RTT during the PS call, according to the embodiments as disclosed herein;

FIG. 8 is a sequence diagram in which a user of the target communication device sends the RTT to the initiator communication device for a PS call, according to the embodiments as disclosed herein;

FIG. 9 is a sequence diagram in which the initiator communication device and the target communication device exchange the RTT for the PS call while the target communication device receives the from the initiator communication device, according to the embodiments as disclosed herein;

FIG. 10 shows an example illustration in which the user of the target communication device sends a temporary response to the voice call with the RTT after accepting the call from the initiator communication device, according to the embodiments as disclosed herein;

FIG. 11 is a sequence diagram in which the user of the target communication device sends a temporary response using RTT to the initiator communication device for an incoming CS call or PS call, while the call is on hold, according to the embodiments as disclosed herein;

FIG. 12 is a sequence diagram in which the user of the target communication device sends the temporary response to the PS voice call after accepting the PS call from the initiator communication device, according to the embodiments as disclosed herein;

FIG. 13 shows an example illustration in which the user of the target communication device rejects the call from the initiator communication device with the RTT, according to the embodiments as disclosed herein;

FIG. 14 is a sequence diagram in which the user of the target communication device rejects an incoming CS call or PS call, and sends a reason using RTT to the initiator communication device, according to the embodiments as disclosed herein;

FIG. 15 is a sequence diagram in which the user of the target communication device rejects the call from the initiator communication device and sends reason for rejection, according to the embodiments as disclosed herein;

FIG. 16 is a sequence diagram in which the user of the target communication device rejects the call from the initiator communication device and sends a reason for rejection, according to the embodiments as disclosed herein;

FIG. 17 shows an example illustration in which the user of the initiator communication device initiates the call by including the reason for the voice call in the RTT, according to the embodiments as disclosed herein;

FIG. 18 is a sequence diagram in which the user of the initiator communication device initiates the call by including the reason in the RTT, according to the embodiments as disclosed herein;

FIG. 19 is a sequence diagram in which the user of the target communication device provides a reason in audio/video for rejecting the call, according to the embodiments as disclosed herein; and FIG. 20 illustrates a computing environment implementing the mechanism of responding to the call with the RTT, according to the embodiments as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein achieve a method and system of responding to a call with a real time text (RTT). The method includes receiving the call by a target communication device. The call is initiated by an initiator communication device.

In an embodiment, the target communication device responds to the call by accepting the call with the RTT.

In another embodiment, the target communication device responds to the call by rejecting the call with the RTT.

In yet another embodiment, the target communication device responds to the call with the RTT by sending a temporary response message to the initiator communication device.

In an embodiment, the target communication device accepts the call with RTT independent of establishment of call session. The call is on hold without establishment of the call session and the target communication device responds to the call with the RTT. A chat window is displayed in the target communication device in which a user of the target communication device enters the text for responding to the call.

In an embodiment, the text can be a numeral, an emoticon, a pre-stored text, a special symbol, alpha-numerals and the like.

In an embodiment, one or more characters entered by the user of the target communication device are sent instantaneously to the initiator communication device.

In an embodiment, the user of the target communication device sends a temporary response message with the RTT to the initiator communication device. The call is on hold while the user of the target communication device sends the temporary response message with the RTT to the initiator communication device. The user of the target communication device unholds the call with the initiator communication device after sending the temporary response message.

In an embodiment, the user of the target communication device can send a pre-recorded audio or video message to the initiator communication device for rejecting the call received from the initiator communication device.

In an embodiment, a user of the initiator communication device can include a reason for the call while initiating the call with the target communication device.

In an embodiment, the call is either a voice call or a video call.

In an embodiment, the voice call is either a circuit switched (CS) call or a packet switched (PS) call.

In an embodiment, the video call is a PS video call.

Referring now to the drawings and more particularly to FIGS. 1 through 20 where similar reference characters denote corresponding features consistently throughout the figures, there are shown preferred embodiments.

FIGS. 1A and 1B illustrate a high level overview of a system for responding to a call with a real time text (RTT), according to embodiments as disclosed herein. As depicted in the FIG. 1A, the system 100 includes an initiator communication device 102a and a target communication device 102b. In an embodiment, the initiator communication device 102a and the target communication device 102b can be a mobile phone, tablet or any other communication device.

In order to respond to the call with the RTT, the initiator communication device 102a or the target communication device 102b has to support the RTT capability.

For better understanding of the embodiments described herein, the system 100 is described by considering the user of the initiator communication device 102a as Bob and the user of the target communication device 102b as Alice.

Bob initiates a voice call as shown in the FIG. 1A. Alice receives a voice call from Bob. Further, Alice can respond to the voice call either by accepting the voice call with the RTT, or reject the voice call with the RTT, or respond to the call with RTT while the call is on hold.

In an embodiment, when Alice accepts the call with RTT, a chat window is displayed on the target communication device 102a for responding to the voice call with the RTT. Alice can enter text in a portion of the keypad.

In an embodiment, the chat window overlays the voice options in the target communication device 102b.

In an embodiment, the voice call is accepted independent of establishment of a call session. The call will be on hold or the call session is not established while the Alice accepts the call with RTT.

In an embodiment, the text entered by the Alice can include numerals, emoticons, a pre-stored text, special symbols, alpha-numerals and the like.

In an embodiment, one or more characters entered by Alice are displayed to Bob instantaneously on the initiator communication device 102a.

In an embodiment, when Alice accepts the call with RTT, a chat window is displayed on the target communication device 102a for responding to the voice call with the RTT. The chat window is displayed to Alice for sending a temporary response message to the voice call with the RTT.

In an embodiment, the voice call is accepted independent of establishment of the call session. The call will be on hold or the call session is not established while the Alice accepts the call with RTT sending a temporary response message to the voice call.

The voice call will be on hold for certain time interval while sending the temporary message to Bob. After sending temporary response message to Bob, Alice unholds the call with Bob.

In an embodiment, when Bob receives the temporary message from Alice, Bob unholds the call with Alice.

In an embodiment, when Alice receives the call from Bob, Alice rejects the voice call from Bob with the RTT. When Alice rejects the voice call with the RTT, a chat window is displayed to Alice for sending a reject cause to the voice call with the RTT. When Alice sends the reject cause with RTT to Bob, the voice call is terminated between Bob and Alice.

In an embodiment, Bob can include a reason for the voice call while initiating the voice call to Alice. A chat window is displayed to Bob for entering the text. In an example, Bob adds the reason as "emergency". The reason is displayed to Alice while ringing.

Though the embodiments described above in the FIG. 1A explicitly mentions about responding to the voice call with the RTT, the above embodiments can be applicable in case of a video call as shown in the FIG. 1B.

FIG. 2A illustrates a block diagram of an initiator communication device with various units, according to the embodiments as disclosed herein. As depicted in the FIG. 2A, the initiator communication device 102a includes a communication interface unit 202a, a call management unit 204a, a voice recognition unit 206a and a keypad invoking unit 208a.

The communication interface unit 202a enables wireless communication with the target communication device 102b or any other communication device.

In an embodiment, the call management unit 204a can be configured to manage the call in the initiator communication device 102a. The call management unit 204a facilitates the initiator communication device 102a to initiate, terminate, hold and unhold the call respectively.

In an embodiment, the voice recognition unit 206a can be configured to recognize voice of the user of the initiator communication device 102a.

In an embodiment, the voice recognition unit 206a can be configured to translate the voice (speech) of the user of the initiator communication device 102a to text. If Bob wish to enable the voice communication after receiving a RTT from Alice, then the voice is recognized using the voice recognition unit 206a and convert to text.

In an embodiment, the voice recognition unit 206b can be configured to translate the text of the user to voice (speech).

In an embodiment, the keypad invoking unit 208b can be configured to invoke a keypad to the user for responding to the voice call with the RTT. The keypad invoking unit 208b invokes the keypad when the user of the initiator communication device 102a intends to send the RTT to the target communication device 102b.

In an embodiment, the keypad invoking unit 208a overlays the voice options available in the screen of the initiator communication device 102a.

FIG. 2B illustrates a block diagram of a target communication device with various units, according to the embodiments as disclosed herein. As depicted in the FIG. 2B, the target communication device 102b includes a communication interface unit 202b, a call management unit 204b, a voice recognition unit 206b and a keypad invoking unit 208b.

The communication interface unit 202b enables the target communication device 102a to communicate with the initiator communication device 102a.

In an embodiment, the call management unit 204b can be configured to manage the call in the target communication device 102b. The call management unit 204b facilitates the target communication device 102b to initiate, terminate hold and unhold the call.

In an embodiment, the voice recognition unit 206b can be configured to recognize voice of the user of the target communication device 102b.

In an embodiment, the voice recognition unit 206b can be configured to convert the voice (speech) of the user of the target communication device 102b to text. If Alice wishes to enable the voice communication after sending a RTT, then the voice is recognized using the voice recognition unit 206b and convert to text.

In an embodiment, the voice recognition unit 206b can be configured to convert the text of the user to voice (speech).

In an embodiment, the keypad invoking unit 208b can be configured to invoke a keypad to the user for responding to the call with the RTT. The keypad invoking unit 208b invokes the keypad when the user of the target communication device 102b intends to send the RTT to the initiator communication device 102a.

FIG. 3 is a sequence diagram in which the target communication device discovers support of the RTT in the initiator communication device, according to the embodiments as disclosed herein. In order to respond to the call with the RTT, the initiator communication device 102a or the target communication device 102b has to support the RTT capability.

In an embodiment, the support of RTT within the target initiator communication device 102a or the target communication device is discovered before the initiator communication device 102a or the target communication devices exchange the RTT.

In an embodiment, the support of RTT within the target initiator communication device 102a or the target communication device is discovered anytime (for example, during the call, before the call).

In order to discover the support of RTT, the target communication device 102a and the initiator communication device 102b exchange signaling messages as described herein.

Initially the target communication device 102b sends (302) Session Initiation Protocol (SIP) OPTIONS message to the terminating internet protocol multimedia subsystem (IMS) core network 104b. In an embodiment, the SIP OPTIONS message includes real time text tag. The terminating IMS core network 102b sends (304) the SIP OPTIONS message to the originating IMS core network 104a. Further, the originating IMS core network 104a sends (306) the SIP OPTIONS message to the initiator communication device 102a.

If the initiator communication device 102a supports the RTT, then the initiator communication device 102a sends (308) 200 OK message to the originating IMS core network 104a. In an embodiment, the 200 OK message includes the real time text tag. The originating IMS core network 104a sends (310) sends the 200 OK message to the terminating IMS core network 104b. Further, the terminating IMS core network 104b sends (312) the 200 OK message to the target communication device 102b. The target communication device 102b discovers the support of RTT after when the 200 OK message is received from the terminating IMS core network 104b.

Hence, with the above described signaling messages, the target communication device 102b discovers the support of the RTT in the initiator communication device 102a.

FIG. 4 is a flow diagram explaining a method 400 of responding to the call with the RTT, according to the embodiments as disclosed herein. The method 400 and other description described herein provide a basis for a control program, which can be implemented using a microcontroller, microprocessor, or any computer readable storage medium.

At step 402, the method 400 includes receiving the call from the initiator communication device 102a. The method 400 allows the call management unit 204b to receive the call from the initiator communication device 102a. In an embodiment, the call is either a voice call or a video call.

In an embodiment, voice call is either the PS call or the CS call received from the initiator communication device 102a. In an embodiment, the video call is a PS video call.

At step 404, the method 400 includes responding to the call with the RTT. The method 400 allows the keypad invoking unit 208b to respond to the call with the RTT. When the call is received at the target communication device 102b, the user of the target communication device 102b can respond to the call with the RTT by invoking the keypad. When the user of the target communication device 102b enters a character through the keypad, the one or more characters are displayed instantaneously on the initiator communication device 102a.

At step 406a, the method 400 includes accepting the call from the initiator communication device 102b. The method 400 allows the call management unit 204b to accept the call. In an embodiment, the call is accepted independent of establishment of call session. The user of the target communication device 102b accepts the call from the initiator communication device. At step 408a, the method 400 includes responding to the call with the RTT. The method 400 allows the keypad invoking unit 208b to respond to the call. When the user of the target communication device 102b accepts the call from the initiator communication device 102a, the keypad is invoked for responding to the call with the RTT. The user of the target communication device 102b enters desired text through the keypad and each character entered by the user is displayed to the initiator communication device 102a instantaneously.

At step 406b, the method 400 includes rejecting the call from the initiator communication device 102a. The method 400 allows the call management unit 204b to reject the call. The user of the target communication device 102b rejects the call from the initiator communication device 102a. At step 408b, the method 400 includes responding to the call with the RTT. The method 400 allows the keypad invoking unit 208b to respond to the call with the RTT. When the user of the target communication device 102b rejects the call from the initiator communication device 102b, the keypad is invoked for responding to the call with the RTT. The user enters desired text through the keypad and each character entered by the user is displayed to the initiator communication device 102a instantaneously.

At step 406c, the method 400 includes accepting the voice call from the initiator communication device 102b. The method 400 allows the call manager unit 204b to accept the voice call. In an embodiment, the call is accepted independent of establishment of call session.

The user of the target communication device 102b accepts the call from the initiator communication device 102a. At step 408c, the method 400 includes responding to the voice call with the RTT when the call is on hold for the time interval. The method 400 allows the call management unit 204b to hold the call and the method 400 allows the keypad invoking unit 208b to respond to the call with the RTT when the call is on hold for the time interval. In an embodiment, the user of the target communication device 102b sends a temporary response through the RTT for the call. For example, the user of the target communication device 102b sends a temporary response such as "hang on for a few seconds" to the user of the initiator communication device 102*a*.

At step 410*c*, the method includes unholding the voice call to initiate communication with the initiator communication device. The method 400 allows the call management unit 208*b* to unhold the call to initiate communication with the initiator communication device 102*a*. After expiry of the time interval (few seconds as in the above example), the user of the target communication device 102*b* initiates communication with the initiator communication device 102*a*.

Further, the various actions, units, steps, blocks, or acts described in the method 400 can be performed in the order presented, in a different order, simultaneously, or a combination thereof. Furthermore, in some embodiments, some of the actions, units, steps, blocks, or acts listed in the FIG. 4 may be omitted.

FIG. 5 shows an example illustration in which a user of the target communication device responds to the call with the RTT after accepting the call, according to the embodiments as disclosed herein. In the example shown in the FIG. 5, the user of the initiator communication device 102*a* is Bob and the user of the target communication device 102*b* is Alice. As shown in the FIG. 5, Bob initiates the voice call to Alice. Alice is presented with options to answer the call traditionally or with RTT. Alice accepts the voice call received from Bob with the RTT. When Alice accepts, the voice call with the RTT, the keypad invoking module 208*b* invokes the keypad in the target communication device 102*b*. A chat window is displayed to Alice for responding to the voice call with the RTT. Alice enters the text in a portion of the keypad.

In an embodiment, the text entered by the Alice can include numerals, emoticons, a pre-stored text, special symbols, alpha-numerals and the like.

In an embodiment, one or more characters entered by Alice are displayed to Bob instantaneously on the initiator communication device 102*a*.

As shown in the FIG. 5, when Alice enters character 'H' through the keypad, the character 'H' is displayed to the Bob instantaneously. All the characters entered by Alice are displayed to Bob instantaneously as shown in the FIG. 5. After receiving the RTT from Alice, in an embodiment, if Bob wish to communicate to Alice through voice. The voice from Bob can be recognized and converted to text in the initiator communication device 102*a* using the voice recognition module 206*a*. The converted text is displayed to Alice. Thus, Alice continues to send the RTT to Bob, while Bob can talk to Alice.

If Bob intends to chat with Alice instead of voice, Bob can send RTT to Alice. Thus both Bob and Alice can chat with each other while the call is on hold. In case, during the chat if Alice intends to talk to Bob, Alice can talk to Bob by switching the chat window to a call interface A as shown in the FIG. 6.

Further, if Alice intends to talk to Bob instead of chat, then Alice switching from chat to voice call by enabling the call interface A. Hence, both Alice and Bob can talk to each other on the voice call or Alice and Bob can chat with each other through RTT (while the voice call is on hold).

Although the embodiments described above explicitly mentions about responding to the voice call with the RTT, it is understood that the above embodiments can be applicable in case of the video call.

FIG. 6 is a sequence diagram in which the user of the target communication device sends the RTT to the initiator communication device for an incoming CS call or PS call according to the embodiments as disclosed herein. In case of the call, initially, the initiator communication device 102*a* sends (602) a call setup message to the target communication device 102*b*. The target communication device 102*b* rings after receiving the call setup message from the terminating IMS core network 104*b*. The target communication device determines (604) that the initiator communication device 102*a* supports RTT by sending the signaling messages as described in FIG. 3. Further, the initiator communication device 102*a* and the target communication device 102*b* establish (606) the call. The target communication device 102*b* accepts (608) the call with the RTT.

When the call is accepted with the RTT, the target communication device 102*b* sends (610) the SIP INVITE message to the terminating IMS core network 104*b*.

In an embodiment, the SIP INVITE message includes a m-line for text (RTT) as defined in the RFC 4103 (OR 3GPP 26.114), an attribute with SENDONLY for the text in the m-line as shown in the FIG. 6.

The terminating IMS core network 104*b* sends the SIP INVITE message to the originating IMS core network 104*a*. Further, the originating IMS core network 104*a* sends the SIP INVITE message to the initiator communication device 102*a*. After receiving the SIP INVITE message from the originating IMS core network 104*a*, the initiator communication device 102*a* sends (612) the 200 OK message to the originating IMS core network 102*a*.

In an embodiment, the 200 OK message includes a m-line for text (RTT) as defined in the RFC 4103 (OR 3GPP 26.114), an attribute with RECVONLY for the text in the m-line as shown in the FIG. 6.

The originating IMS core network 102*a* sends the 200 OK message to the terminating IMS core network 104*b*. Further, the terminating IMS core network 104*b* sends the 200 OK message to the target communication device 102*b*.

When the target communication device 102*b* receives the 200 OK message from the terminating IMS core network 104*b*, the target communication device 102*b* sends (614) the RTT to the initiator communication device 102*a*. The target communication device 102*b* sends RTT to the initiator communication device 102*a* while receiving the voice from the initiator communication device 102*a*.

The initiator communication device correlates (616) the RTT with the call and displays it together with the call. Call continues (618) between the target communication device 102*b* and initiator communication device 102*a*, while the RTT (614) is shared in parallel.

In an embodiment, the call can be either CS call or PS call.

In an embodiment, the SIP INVITE message includes a m-line for text (RTT) as defined in the RFC 4103 (OR 3GPP 26.114), an attribute with SENDRECV for the text. Further, the 200 OK message includes a m-line for text (RTT) as defined in the RFC 4103 (OR 3GPP 26.114), an attribute with SENDRECV for the text, to establish a full-duplex RTT session between the target communication device 102*b* and initiator communication device 102*a*.

In an embodiment, the SIP INVITE message includes a m-line for text (RTT) as defined in the RFC 4103 (OR 3GPP 26.114), an attribute with RECVONLY for the text. Further, the 200 OK message includes a m-line for text (RTT) as defined in the RFC 4103 (OR 3GPP 26.114), an attribute with SENDONLY for the text, to establish a simplex RTT session from the initiator communication device 102*a* to target communication device 102*b*.

FIG. 7 is a sequence diagram in which the initiator communication device and the target communication device exchange the RTT during the PS call, according to the embodiments as disclosed herein. In case of the PS voice call, initially, the initiator communication device sends (702) the SIP INVITE message to the originating IMS core network 104*a*.

In an embodiment, the SIP INVITE message includes a m-line for text (RTT) as defined in RFC 4103 (OR 3GPP 26.114), an attribute with SENDRECV for the text m-line, a m-line for audio data (voice call and an attribute with SENDRECV for the audio m-line.

With the SIP INVITE message, both BOB and Alice can exchange RTT while both Alice and Bob are on call.

The originating IMS core network sends the SIP INVITE MESSAGE to the terminating IMS core network 104*b*. The terminating IMS core network 104*b* sends the SIP INVITE message to the target communication device 102*b*. The target communication device 102*b* rings upon receiving the SIP INVITE message from the terminating IMS core network.

The target communication device 102*b* receives the SIP INVITE message from the terminating IMS core network 104*b* and sends (704) 200 OK message to the terminating IMS core network 104*b*.

In an embodiment, the 200 OK message includes a m-line for text (RTT) as defined in RFC 4103 (OR 3GPP 26.114), an attribute with SENDRECV for the text m-line, a m-line for audio data (voice call and an attribute with SENDRECV for the audio m-line as shown in the FIG. 7.

The terminating IMS core network 104*b* sends the 200 OK message to the originating IMS core network 104*a*. The originating IMS core network 104*a* sends the 200 OK message to the initiator communication device 102*a*.

When the initiator communication device 102*b* receives the 200 OK message from the originating IMS core network, the initiator communication device 102*a* and the target communication device 102*b* establish (706) SIP session. The PS call is established (708) between the initiator communication device 102*a* and the target communication device 102*b* when the SIP session is established. The target communication device 102*b* and the initiator communication device exchange the RTT (710) during the voice call. The initiator communication device and target communication device correlate (712) the RTT with the call and display it together with the call.

FIG. 8 is a sequence diagram in which a user of the target communication device sends the RTT to the initiator communication device for a packet switched (PS) call, according to the embodiments as disclosed herein. In case of the PS voice call, the initiator communication device sends (802) a SIP) INVITE message to an originating IMS subsystem core network 104*a*.

In an embodiment, the SIP INVITE message includes a m-line for voice call (audio data) and an attribute with SENDRECV for audio m-line as shown in the FIG. 8.

The originating IMS core network 104*a* sends the SIP INVITE message to a terminating IMS core network 104*b*. The terminating IMS core network 104*b* sends the SIP INVITE message to the target communication device 102*b*. The target communication device 102*b* rings upon receiving the SIP INVITE message from the terminating IMS core network.

The target communication device 102*b* receives the SIP INVITE message from the terminating IMS core network 104*b* and answers the call with the RTT. Further, the target communication device 104*b* sends (804) 183 (answer) message to the terminating IMS core network 104*b*. The terminating IMS core network 104*b* sends the 183 (answer) message to the originating IMS core network 104*a*. The originating IMS core network 104*a* sends the 183 (answer) message to the initiator communication device 102*a*.

The initiator communication device 102*a* receives the 183 (answer) message from the originating IMS core network 104*a* and sends (806) a Provisional Acknowledgement (PRACK) message to the originating IMS core network 104*a*. The originating IMS core network 104*a* sends the PRACK message to the terminating IMS core network 104*b*. The terminating IMS core network 104*b* sends the PRACK message to the target communication device 102*b*.

After receiving the PRACK message from the terminating IMS core network 104*b*, the target communication device 102*b* sends (808) 200/PRACK message to the terminating IMS core network 104*b*. The terminating IMS core network 104*b* sends 200/PRACK message to the originating IMS core network 104*a*. The originating IMS core network 104*a* sends 200/PRACK message to the initiator communication device 102*a*.

Further, the target communication device 102*b* sends (810) a SIP UPDATE message to the terminating IMS core network 104*b*.

In an embodiment, the SIP UPDATE message includes a m-line for text (RTT) as defined in RFC 4103 (OR 3GPP 26.114), an attribute with SENDONLY for the text in the m-line, a m-line for receiving audio data (voice call) and an attribute with RECVONLY for the audio m-line as shown in the FIG. 8.

With the SIP UPDATE message, Alice can only receive the audio data (voice call) from Bob and can only send the RTT to Bob.

The terminating IMS core network 104*b* sends the SIP UPDATE message to the originating IMS core network 104*a*. The originating IMS core network 104*a* sends the SIP UPDATE message to the initiator communication device 102*a*.

The initiator communication device 102*a* receives the SIP UPDATE message from the originating IMS core network 104*a* and accepts the SIP UPDATE message automatically. Further, the initiator communication device 102*a* sends (812) 200 UPDATE message to the originating IMS core network 104*a*.

In an embodiment, the 200 UPDATE message includes a m-line for text (RTT) as defined in RFC 4103 (OR 3GPP 26.114), an attribute with RECVONLY for the text in the m-line, a m-line for receiving audio data (voice call) and an attribute with SENDONLY for the audio m-line as shown in the FIG. 8.

With the SIP UPDATE message, Bob can only send the audio data (voice call) to Alice and can only receive RTT from Alice.

The originating IMS core network 104*a* sends the 200 UPDATE message to the terminating IMS core network 104*b*. The terminating IMS core network 104*b* sends the 200 UPDATE message to the target communication device 102*b*.

The target communication device 102*b* receives the 200 UPDATE message from the terminating IMS core network 104*b* and sends (814) 200 OK message to the terminating IMS core network 104*b*. The terminating IMS core network 104*b* sends the 200 OK message to the originating IMS core network 104*a*. The originating IMS core network 104*a* sends the 200 OK message to the initiator communication device 102*a*.

When the initiator communication device 102*b* receives the 200 OK message from the originating IMS core network, the initiator communication device 102*a* and the target communication device 102*b* establish (816) SIP session. The PS call is established (818) between the initiator communication device 102a and the target communication device 102b when the SIP session is established. The target communication device 102b responds (820) with the RTT for the voice call from the initiator communication device 102a. The initiator communication device correlates (822) the RTT with the call and displays it together with the call.

FIG. 9 is a sequence diagram in which the initiator communication device and the target communication device exchange the RTT for the PS voice call while the target communication device receives the voice from the initiator communication device, according to the embodiments as disclosed herein. In case of the PS voice call, initially, the initiator communication device 102a sends (902) the SIP INVITE message to the originating IMS core network 104a.

In an embodiment, the SIP INVITE message includes a m-line for voice call (audio data) and an attribute with SENDRECV for audio m-line as shown in the FIG. 9.

The originating IMS core network sends the SIP INVITE MESSAGE to the terminating IMS core network 104b. The terminating IMS core network 104b sends the SIP INVITE message to the target communication device 102b. The target communication device 102b rings upon receiving the SIP INVITE message from the terminating IMS core network.

The target communication device 102b receives the SIP INVITE message from the terminating IMS core network 104b and answers the call with the RTT. Further, the target communication device 104b sends (904) 183 (answer) message to the terminating IMS core network 104b. The terminating IMS core network 104b sends the 183 (answer) message to the originating IMS core network 104a. The originating IMS core network 104a sends the 183 (answer) message to the initiator communication device 102a.

The initiator communication device 102a receives the 183 (answer) message from the originating IMS core network 104a and sends (906) a PRACK message to the originating IMS core network 104a. The originating IMS core network 104a sends the PRACK message to the terminating IMS core network 104b. The terminating IMS core network 104b sends the PRACK message to the target communication device 102b.

After receiving the PRACK message from the terminating IMS core network 104b, the target communication device 102b sends (908) 200/PRACK message to the terminating IMS core network 104b. The terminating IMS core network 104b sends 200/PRACK message to the originating IMS core network 104a. The originating IMS core network 104a sends 200/PRACK message to the initiator communication device 102a.

Further, the target communication device 102b sends (910) a SIP UPDATE message to the terminating IMS core network 104b.

In an embodiment, the SIP UPDATE message includes a m-line for text (RTT) as defined in RFC 4103 (OR 3GPP 26.114), an attribute with SENDRECV for the text in the m-line, a m-line for only receiving audio data (voice call) and an attribute with RECVONLY for the audio m-line as shown in the FIG. 9.

With the SIP UPDATE message, Bob can only send the audio data (voice call) to Alice and both BOB and Alice can exchange RTT.

The terminating IMS core network 104b sends the SIP UPDATE message to the originating IMS core network 104a. The originating IMS core network 104a sends the SIP UPDATE message to the initiator communication device 102a.

The initiator communication device 102a receives the SIP UPDATE message from the originating IMS core network 104a and accepts the SIP UPDATE message automatically. Further, the initiator communication device 102a sends (912) 200 UPDATE message to the originating IMS core network 104a.

In an embodiment, the 200 UPDATE message includes a m-line for text (RTT) as defined in RFC 4103 (OR 3GPP 26.114), an attribute with SENDRECV for the text in the m-line, a m-line for only sending audio data (voice call) and an attribute with SEND for the audio m-line as shown in the FIG. 9.

The originating IMS core network 104a sends the 200 UPDATE message to the terminating IMS core network 104b. The terminating IMS core network 104b sends the 200 UPDATE message to the target communication device 102b.

The target communication device 102b receives the 200 UPDATE message from the terminating IMS core network 104b and sends (914) 200 OK message to the terminating IMS core network 104b. The terminating IMS core network 104b sends the 200 OK message to the originating IMS core network 104a. The originating IMS core network 104a sends the 200 OK message to the initiator communication device 102a.

When the initiator communication device 102b receives the 200 OK message from the originating IMS core network, the initiator communication device 102a and the target communication device 102b establish (916) SIP session. The PS call is established (918) between the initiator communication device 102a and the target communication device 102b when the SIP session is established. The target communication device 102b exchanges the RTT (920) while the target communication device 102b receives the voice from the initiator communication device 102a. The initiator communication device correlates (922) the RTT with the call and displays it together with the call.

FIG. 10 shows an example illustration in which the user of the target communication device sends a temporary response to the voice call with the RTT after accepting the voice call from the initiator communication device, according to the embodiments as disclosed herein. As shown in the FIG. 10, the user of the initiator communication device 102a is Bob and the user of the target communication device 102b is Alice. Initially, Bob initiates the voice call to Alice. Alice is presented with options to answer the call traditionally or with RTT. Alice accepts the voice call from Bob with the RTT. When Alice accepts, the voice call with the RTT, the keypad invoking module 208b invokes the keypad in the target communication device 102b. The chat window is displayed to Alice for sending a temporary response message to the voice call with the RTT. The voice call will be on hold for certain time interval, or till Alice explicitly unholds the voice call, while sending the temporary message to Bob. As shown in the FIG. 10, Alice enters text "Hang on a sec". Each character in the text entered by Alice is displayed to Bob instantaneously. When the temporary response message is sent to Bob, the voice call is unholded between Bob and Alice. Bob and Alice can talk to each other once the call is unholded.

In an embodiment, the voice call can be unholded by either Bob or Alice after the time interval. The time interval is desired by the either Bob or Alice.

FIG. 11 is a sequence diagram in which the user of the target communication device sends a temporary response using RTT to the initiator communication device for an incoming CS call or PS call, after accepting the call from the initiator communication device, while the call is on hold, according to the embodiments as disclosed herein. Initially, the initiator communication device 102a sends (1102) a call setup message to the target communication device 102b. The target communication device 102b rings after receiving the call setup message from the terminating IMS core network 104b. The target communication device determines (1104) that the initiator communication device 102a supports RTT by sending the signaling messages as described in FIG. 3. Further, the initiator communication device 102a and the target communication device 102b establish (1106) the call. The target communication device 102b accepts (1108) the call with the RTT to send a temporary response.

When the call is accepted with the RTT to send a temporary response, the target communication device 102b puts the call on hold and sends (1110) the SIP INVITE message to the terminating IMS core network 104b.

In an embodiment, the SIP INVITE message includes a m-line for text (RTT) as defined in the RFC 4103 (OR 3GPP 26.114), an attribute with SENDONLY for the text in the m-line as shown in the FIG. 11.

The terminating IMS core network 104b sends the SIP INVITE message to the originating IMS core network 104a. Further, the originating IMS core network 104a sends the SIP INVITE message to the initiator communication device 102a. After receiving the SIP INVITE message from the originating IMS core network 104a, the initiator communication device 102a sends (1112) the 200 OK message to the originating IMS core network 102a.

In an embodiment, the 200 OK message includes a m-line for text (RTT) as defined in the RFC 4103 (OR 3GPP 26.114), an attribute with RECVONLY for the text in the m-line as shown in the FIG. 11.

The originating IMS core network 102a sends the 200 OK message to the terminating IMS core network 104b. Further, the terminating IMS core network 104b sends the 200 OK message to the target communication device 102b.

When the target communication device 102b receives the 200 OK message from the terminating IMS core network 104b, the target communication device 102b sends (1114) the temporary response using RTT to the initiator communication device 102a. The target communication device 102b sends the temporary response using RTT to the initiator communication device 102a while the call is on hold. The initiator communication device correlates (1116) the RTT with the call and displays it together with the call.

The target communication device 102b unholds (1118) the call between the target communication device 102b and initiator communication device 102a, after the RTT (1114) is shared. The call continues (1120) after the exchange of temporary RTT.

In an embodiment, the call can be either CS Call or PS call.

In an embodiment, the SIP INVITE message includes a m-line for text (RTT) as defined in the RFC 4103 (OR 3GPP 26.114), an attribute with SENDRECV for the text. Further, the 200 OK message includes a m-line for text (RTT) as defined in the RFC 4103 (OR 3GPP 26.114), an attribute with SENDRECV for the text, to establish a full-duplex RTT session between the target communication device 102b and initiator communication device 102a while the call is on hold.

In an embodiment, the SIP INVITE message includes a m-line for text (RTT) as defined in the RFC 4103 (OR 3GPP 26.114), an attribute with RECVONLY for the text. Further, the 200 OK message includes a m-line for text (RTT) as defined in the RFC 4103 (OR 3GPP 26.114), an attribute with SENDONLY for the text, to establish a simplex RTT session from the initiator communication device 102a to target communication device 102b, while the call is on hold.

FIG. 12 is a sequence diagram in which the user of the target communication device sends the temporary response to the PS voice call after accepting the PS voice call from the initiator communication device, according to the embodiments as disclosed herein. Initially, the initiator communication device 102a sends (1202) a SIP INVITE message to the originating IMS core network 104a.

In an embodiment, the SIP INVITE message includes a m-line for audio data (voice call) and an attribute with SENDRECV for audio data in the m-line.

The originating IMS core network 104a sends the SIP INVITE MESSAGE to a terminating IMS core network 104b. The terminating IMS core network 104b sends the SIP INVITE message to the target communication device 102b. The target communication device 102b rings upon receiving the SIP INVITE message from the terminating IMS core network 104b.

The target communication device 102b receives the SIP INVITE message from the terminating IMS core network 104b and answers the call with the RTT. Further, the target communication device 104b sends (1204) 183 (answer) message to the terminating IMS core network 104b. The terminating IMS core network 104b sends the 183 (answer) message to the originating IMS core network 104a. The originating IMS core network 104a sends the 183 (answer) message to the initiator communication device 102a.

The initiator communication device 102a receives the 183 (answer) message from the originating IMS core network 104a and sends (1206) a PRACK message to the originating IMS core network 104a. The originating IMS core network 104a sends the PRACK message to the terminating IMS core network 104b. The terminating IMS core network 104b sends the PRACK message to the target communication device 102b.

After receiving the PRACK message from the terminating IMS core network 104b, the target communication device 102b sends (1208) 200/PRACK message to the terminating IMS core network 104b. The terminating IMS core network 104b sends 200/PRACK message to the originating IMS core network 104a. The originating IMS core network 104a sends 200/PRACK message to the initiator communication device 102a.

Further, the target communication device 102b sends (1210) a SIP UPDATE message to the terminating IMS core network 104b.

In an embodiment, the SIP UPDATE message includes a m-line for text (RTT) as defined in RFC 4103 (OR 3GPP 26.114) and an attribute with SENDONLY for the text in the m-line.

The terminating IMS core network 104b sends the SIP UPDATE message to the originating IMS core network 104a. The originating IMS core network 104a sends the SIP UPDATE message to the initiator communication device 102a.

With the SIP UPDATE message, Alice can only send RTT to Bob.

The initiator communication device 102a receives the SIP UPDATE message from the originating IMS core network 104a and accepts the SIP UPDATE message automatically. Further, the initiator communication device 102a sends (1212) 200 UPDATE message to the originating IMS core network 104a. The originating IMS core network 104a sends the 200 UPDATE message to the terminating IMS core network 104*b*. The terminating IMS core network 104*b* sends the 200 UPDATE message to the target communication device 102*b*.

The target communication device 102*b* receives the 200 UPDATE message from the terminating IMS core network 104*b* and sends (1214) 200 OK message to the terminating IMS core network 104*b*. The terminating IMS core network 104*b* sends the 200 OK message to the originating IMS core network 104*a*. The originating IMS core network 104*a* sends the 200 OK message to the initiator communication device 102*a*.

When the initiator communication device 102*b* receives the 200 OK message from the originating IMS core network, the initiator communication device 102*a* and the target communication device 102*b* establish (1216) SIP session. When the SIP session is established, the target communication device 102*b* responds (1218) with the RTT for the voice call from the initiator communication device 102*a*. The initiator communication device correlates (1220) the RTT with the call and displays it together with the call. The PS call is established (1222) between the initiator communication device 102*a* and the target communication device 102*b*.

FIG. 13 shows an example illustration in which the user of the target communication device rejects the voice call from the initiator communication device with the RTT, according to the embodiments as disclosed herein. As shown in the FIG. 13, the user of the initiator communication device 102*a* is Bob and the user of the target communication device 102*b* is Alice. Initially, Bob initiates the voice call to Alice. Alice is presented with options to answer the call traditionally or with RTT. Alice rejects the voice call from Bob with the RTT. When Alice rejects, the voice call with the RTT, the keypad invoking module 208*b* invokes the keypad in the target communication device 102*b*. The chat window is displayed to Alice for sending a reject cause to the voice call with the RTT. As shown in the FIG. 13, Alice sends text "will call you soon" to Bob. Each character in the text entered by Alice is displayed to Bob instantaneously. When Alice sends the reject cause with RTT to Bob, the voice call is terminated at the initiator communication device 102*a* and the target communication device.

FIG. 14 is a sequence diagram in which the user of the target communication rejects an incoming CS call or PS call and sends a reason using RTT to the initiator communication device, according to the embodiments as disclosed herein. Initially, the initiator communication device 102*a* sends (1402) a call setup message to the target communication device 102*b*. The target communication device 102*b* rings after receiving the call setup message from the terminating IMS core network 104*b*. The target communication device determines (1404) that the initiator communication device 102*a* supports RTT by sending the signaling messages as described in FIG. 3. Further, the initiator communication device 102*a* rejects (1406) the call.

When the call is rejected the target communication device 102*b* sends (1408) the SIP INVITE message to the terminating IMS core network 104*b*, in parallel.

In an embodiment, the SIP INVITE message includes a m-line for text (RTT) as defined in the RFC 4103 (OR 3GPP 26.114), an attribute with SENDONLY for the text in the m-line as shown in the FIG. 14.

The terminating IMS core network 104*b* sends the SIP INVITE message to the originating IMS core network 104*a*. Further, the originating IMS core network 104*a* sends the SIP INVITE message to the initiator communication device 102*a*. After receiving the SIP INVITE message from the originating IMS core network 104*a*, the initiator communication device 102*a* sends (1410) the 200 OK message to the originating IMS core network 102*a*.

In an embodiment, the 200 OK message includes a m-line for text (RTT) as defined in the RFC 4103 (OR 3GPP 26.114), an attribute with RECVONLY for the text in the m-line as shown in the FIG. 14.

The originating IMS core network 102*a* sends the 200 OK message to the terminating IMS core network 104*b*. Further, the terminating IMS core network 104*b* sends the 200 OK message to the target communication device 102*b*.

When the target communication device 102*b* receives the 200 OK message from the terminating IMS core network 104*b*, the target communication device 102*b* sends (1412) the reason using RTT to the initiator communication device 102*a*. The target communication device 102*b* sends the reason using RTT to the initiator communication device 102*a* while the call is being rejected. The initiator communication device correlates (1414) the RTT with the call and displays it together with the call.

In an embodiment, the call (1406) can be either Circuit Switched Call or Packet Switched call.

In an embodiment, the SIP INVITE message includes a m-line for text (RTT) as defined in the RFC 4103 (OR 3GPP 26.114), an attribute with SENDRECV for the text. Further, the 200 OK message includes a m-line for text (RTT) as defined in the RFC 4103 (OR 3GPP 26.114), an attribute with SENDRECV for the text, to establish a full-duplex RTT session between the target communication device 102*b* and initiator communication device 102*a* after the call is rejected.

In an embodiment, the SIP INVITE message includes a m-line for text (RTT) as defined in the RFC 4103 (OR 3GPP 26.114), an attribute with RECVONLY for the text. Further, the 200 OK message includes a m-line for text (RTT) as defined in the RFC 4103 (OR 3GPP 26.114), an attribute with SENDONLY for the text, to establish a simplex RTT session from the initiator communication device 102*a* to target communication device 102*b*, after the call is rejected.

FIG. 15 is a sequence diagram in which the user of the target communication device rejects the voice call from the initiator communication device and sends reason for rejection, according to the embodiments as disclosed herein. In case of the PS call, initially, the initiator communication device 102*a* sends (1502) a SIP INVITE message to an originating IMS core network 104*a*.

In an embodiment, the SIP INVITE message includes a m-line for voice call (audio data) and an attribute with SENDRECV for audio m-line as shown in the FIG. 15.

The originating IMS core network 104*a* sends the SIP INVITE message to a terminating IMS core network 104*b*. The terminating IMS core network 104*b* sends the SIP INVITE message to the target communication device 102*b*. The target communication device 102*b* rings upon receiving the SIP INVITE message from the terminating IMS core network.

The target communication device 102*b* receives the SIP INVITE message from the terminating IMS core network 104*b* and answers the call with the RTT. Further, the target communication device 104*b* sends (1504) 183 (answer) message to the terminating IMS core network 104*b*. The terminating IMS core network 104*b* sends the 183 (answer) message to the originating IMS core network 104*a*. The originating IMS core network 104*a* sends the 183 (answer) message to the initiator communication device 102*a*.

The initiator communication device 102*a* receives the 183 (answer) message from the originating IMS core network 104*a* and sends (1506) a PRACK message to the originating IMS core network 104*a*. The originating IMS core network 104*a* sends the PRACK message to the terminating IMS core network 104*b*. The terminating IMS core network 104*b* sends the PRACK message to the target communication device 102*b*.

After receiving the PRACK message from the terminating IMS core network 104*b*, the target communication device 102*b* sends (1508) 200/PRACK message to the terminating IMS core network 104*b*. The terminating IMS core network 104*b* sends 200/PRACK message to the originating IMS core network 104*a*. The originating IMS core network 104*a* sends 200/PRACK message to the initiator communication device 102*a*.

Further, the target communication device 102*b* sends (1510) the SIP UPDATE message to the terminating IMS core network 104*b*.

With the SIP UPDATE message, Alice can only send RTT to Bob for sending reason to reject the call.

In an embodiment, the SIP UPDATE message includes a m-line for text as defined in the RFC 4103 (OR 3GPP 26.114), an attribute with SENDONLY and m-line for audio is set to port 0.

The terminating IMS core network 104*b* sends the SIP UPDATE message to the originating IMS core network 104*a*. The originating IMS core network 104*a* sends the SIP UPDATE message to the initiator communication device 102*a*.

The initiator communication device 102*a* receives the SIP UPDATE message from the originating IMS core network 104*a* and accepts the SIP UPDATE message automatically. Further, the initiator communication device 102*a* sends (1512) 200 UPDATE message to the originating IMS core network 104*a*.

In an embodiment, the 200 UPDATE message includes a m-line for text as defined in the RFC 4103 (OR 3GPP 26.114), an attribute with RECVONLY and m-line for audio is set to port 0.

The originating IMS core network 104*a* sends the 200 UPDATE message to the terminating IMS core network 104*b*. The terminating IMS core network 104*b* sends the 200 UPDATE message to the target communication device 102*b*.

The target communication device 102*b* receives the 200 UPDATE message from the terminating IMS core network 104*b* and sends (1514) 200 OK message to the terminating IMS core network 104*b*.

In an embodiment, the 200 OK message includes In an embodiment, the 200 UPDATE message includes a m-line for text as defined in the RFC 4103 (OR 3GPP 26.114), an attribute with RECVONLY and m-line for audio is set to port 0.

The terminating IMS core network 104*b* sends the 200 OK message to the originating IMS core network 104*a*. The originating IMS core network 104*a* sends the 200 OK message to the initiator communication device 102*a*.

When the initiator communication device 102*b* receives the 200 OK message from the originating IMS core network, the initiator communication device 102*a* and the target communication device 102*b* establish (1516) SIP session. When the SIP session is established, the target communication device 102*b* responds (1518) with the RTT for the voice call from the initiator communication device 102*a*. The initiator communication device correlates (1520) the RTT with the call and displays it together with the call.

FIG. 16 is a sequence diagram in which the user of the target communication device rejects the voice call from the initiator communication device and sends a reason for rejection, according to the embodiments as disclosed herein. In case of the PS call, initially, the initiator communication device sends (1602) a SIP INVITE message to an originating IMS core network 104*a*.

In an embodiment, the SIP INVITE message includes a m-line for text (RTT) as defined in RFC 4103 (OR 3GPP 26.114), an attribute with SENDRECV for the text m-line, a m-line for audio data (voice call and an attribute with SENDRECV for the audio m-line.

The originating IMS core network sends the SIP INVITE MESSAGE to a terminating IMS core network 104*b*. The terminating IMS core network 104*b* sends the SIP INVITE message to the target communication device 102*b*. The target communication device 102*b* rings upon receiving the SIP INVITE message from the terminating IMS core network 104*b*.

The target communication device 102*b* receives the SIP INVITE message from the terminating IMS core network 104*b* and sends (1604) 200 OK message to the terminating IMS core network 104*b*.

With the 200 OK message, Alice can only send RTT to Bob for sending reason to reject the call.

In an embodiment, the 200 OK includes m-line for text (RTT) as defined in RFC 4103 (OR 3GPP 26.114), a m-line for audio data (voice call and an attribute with SENDONLY for the audio m-line.

The terminating IMS core network 104*b* sends the 200 OK message to the originating IMS core network 104*a*. The originating IMS core network 104*a* sends the 200 OK message to the initiator communication device 102*a*.

When the initiator communication device 102*b* receives the 200 OK message from the originating IMS core network, the initiator communication device 102*a* and the target communication device 102*b* establish (1606) SIP session. When the SIP session is established, the target communication device 102*b* responds (1608) with the RTT for the voice call from the initiator communication device 102*a*. The initiator communication device correlates (1610) the RTT with the call and displays it together with the call.

FIG. 17 shows an example illustration in which the user of the initiator communication device initiates the voice all by including the RTT, according to the embodiments as disclosed herein. As shown in the FIG. 17, the user of the initiator communication device 102*a* is Bob and the user of the target communication device 102*b* is Alice. Initially, Bob initiates the voice call to Alice. When the voice call is initiated, for example after a few seconds, Bob can include a reason for the voice call. In the example shown in the FIG. 17, the chat window is displayed to Bob for entering the text. Bob adds the reason as "emergency". The reason is displayed to Alice during ringing as shown in the FIG. 17.

FIG. 18 is a sequence diagram in which the user of the initiator communication device initiates the voice call by including the reason in the RTT, according to the embodiments as disclosed herein. In case of the PS call, initially, the initiator communication device sends (1802) a SIP INVITE message to the originating IMS core network 104*a*.

In an embodiment, the SIP INVITE message includes a m-line for audio data (voice call), an attribute with SENDRECV for the audio m-line and a SIP INFO package: Recv-Info which contains the reason for the incoming call.

With the SIP INVITE message Bob can add reason for the call while initiating the call to Alice.

The originating IMS core network sends the SIP INVITE message to a terminating IMS core network 104*b*. The terminating IMS core network 104*b* sends the SIP INVITE message to the target communication device 102*b*. The target communication device 102*b* rings upon receiving the SIP INVITE message from the terminating IMS core network 104*b*.

The target communication device 102*b* receives the SIP INVITE message from the terminating IMS core network 104*b* and answers the call with the RTT. Further, the target communication device 104*b* sends (1804) 183 (answer) message to the terminating IMS core network 104*b*. The terminating IMS core network 104*b* sends the 183 (answer) message to the originating IMS core network 104*a*. The originating IMS core network 104*a* sends the 183 (answer) message to the initiator communication device 102*a*.

When the initiator communication device 102*a* receives the 183 (answer) message from the originating IMS core network, the initiator communication device can include reason for the PS call. The reason for the PS call is included in a SIP INFO message. The initiator communication device 102*a* sends (1806) the SIP INFO message to the originating IMS core network 104*a*.

In an embodiment, the SIP INFO message includes "reason for incoming call" in the body of the SIP INFO request and "reason for incoming call" in the SIP INFO package.

The originating IMS core network 104*a* sends the SIP INFO message to the terminating IMS core network 104*b*. Further, the terminating IMS core network 104*b* sends the SIP INFO message to the target communication device 102*b*.

The target communication device 102*b* receives the SIP info message from the terminating IMS core network 104*b* and sends (1808) 200 OK (INFO) message to the terminating IMS core network 104*b*. The target communication device correlates (1810) the SIP INFO message with the call and displays it together with the call. The terminating IMS core network 104*b* sends the 200 OK (INFO) message to the originating IMS core network. Further, the originating IMS core network 104*a* sends the 200 OK (INFO) message to the initiator communication device 102*a*.

Further, the target communication device sends (1812) 603 decline message to the terminating IMS core network 104*b*. The terminating IMS core network 104*b* sends the 603 decline message to the originating IMS core network and the originating IMS core network 104*a* sends the 603 decline message to the initiator communication device 102*a*.

FIG. 19 is a sequence diagram in which in which the user of the target communication device provides a reason in audio/video for rejecting the call, according to the embodiments as disclosed herein. In case of the PS call, initially, the initiator communication device 102*a* sends (1902) a SIP INVITE message to the originating IMS core network 104*a*.

In an embodiment, the SIP INVITE message includes a m-line for audio data (voice call), an attribute with SEND-RECV for the audio m-line.

The originating IMS core network 104*a* sends the SIP INVITE MESSAGE to a terminating IMS core network 104*b*. The terminating IMS core network 104*b* sends the SIP INVITE message to the target communication device 102*b*. The target communication device 102*b* rings upon receiving the SIP INVITE message from the terminating IMS core network.

The target communication device 102*b* receives the SIP INVITE message from the terminating IMS core network 104*b* and answers the call with the RTT. Further, the target communication device 104*b* sends (1904) 183 session progress (answer) message to the terminating IMS core network 104*b*.

In an embodiment, the 183 session progress (answer) message includes a m-line for live/recorded audio data for sending to the initiator communication device 102*a*, an attribute with SEND for audio m-line and connection information (such as for example, IP address).

The terminating IMS core network 104*b* sends the 183 session progress (answer) message to the originating IMS core network 104*a*. The originating IMS core network 104*a* sends the 183 session progress (answer) message to the initiator communication device 102*a*.

The initiator communication device 102*a* receives the 183 session progress (answer) message from the originating IMS core network 104*a* and sends (1906) a PRACK message to the originating IMS core network 104*a*. The originating IMS core network 104*a* sends the PRACK message to the terminating IMS core network 104*b*. The terminating IMS core network 104*b* sends the PRACK message to the target communication device 102*b*.

After receiving the PRACK message from the terminating IMS core network 104*b*, the target communication device 102*b* sends (1908) 200/PRACK message to the terminating IMS core network 104*b*. The terminating IMS core network 104*b* sends 200/PRACK message to the originating IMS core network 104*a*. The originating IMS core network 104*a* sends 200/PRACK message to the initiator communication device 102*a*.

The target communication device 102*b* sends (1910) either audio or video response (like early media) to the initiator communication device 102*a*. The initiator communication device correlates (1912) the early media with the call and plays it together with the call. Further, the target communication device 102*b* sends 603 decline message (1914) to the terminating IMS core network 104*b* to reject the voice call. The terminating IMS core network 104*b* sends the 603 decline message to the originating IMS core network 104*a*. The originating IMS core network 104*a* sends the 603 decline message to the initiator communication device 102*a*.

Even though the embodiments described above explicitly mentions about responding to the voice call with the RTT, it is understood that the above embodiments can be applicable in case of the video call.

FIG. 20 illustrates a computing environment implementing the mechanism of responding to the call with the RTT, according to the embodiments as disclosed herein. As depicted the computing environment 2002 comprises at least one processing unit 808 that is equipped with a control unit 2004 and an Arithmetic Logic Unit (ALU) 2006, a memory 2010, a storage unit 2006, plurality of networking devices 2008 and a plurality Input output (I/O) devices 2012. The processing unit 2008 is responsible for processing the instructions of the algorithm. The processing unit 2008 receives commands from the control unit in order to perform its processing. Further, any logical and arithmetic operations involved in the execution of the instructions are computed with the help of the ALU 2006.

The overall computing environment 2002 can be composed of multiple homogeneous and/or heterogeneous cores, multiple CPUs of different kinds, special media and other accelerators. The processing unit 2008 is responsible for processing the instructions of the algorithm. Further, the plurality of processing units 2008 may be located on a single chip or over multiple chips.

The algorithm comprising of instructions and codes required for the implementation are stored in either the memory unit 2010 or the storage 2012 or both. At the time of execution, the instructions may be fetched from the corresponding memory 2005 and/or storage 2006, and executed by the processing unit 2004.

In case of any hardware implementations various networking devices 2016 or external I/O devices 2014 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1A, 1B, 2, 3, 5, 6-20 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method of responding to a call with a text by a target communication device, the method comprising:
   receiving a call from an initiator communication device;
   receiving, from the initiator communication device, information for the call in case that the target communication device does not answer the call during a predetermined time interval;
   transmitting, to a network, a first message including a real time text (RTT) tag, the first message indicating support of a RTT of the target communication device;
   receiving, from the network, a second message including the RTT tag, the second message indicating support of the RTT of the initiator communication device; and
   responding to the call with the RTT based on the information for the call and the second message, wherein at least one character entered by the target communication device in the RTT is displayed instantaneously on the initiator communication device.

2. The method of claim 1, wherein responding by the target communication device to the call with the RTT comprises:
   accepting the call received from the initiator communication device, wherein the call is accepted independent of establishment of a call session; and
   responding to the call with the RTT after accepting the call, wherein the RTT is sent to the initiator communication device when call is on hold.

3. The method of claim 1, wherein responding by the target communication device to the call with the RTT comprises:
   rejecting the call from the initiator communication device; and
   responding to the call with the RTT.

4. The method of claim 1, wherein responding by the target communication device to the call with the RTT comprises:
   accepting the call received from the initiator communication device, wherein the call is accepted independent of establishment of a call session;
   responding to the call with the RTT after accepting the call, wherein the RTT is sent to the initiator communication device when call is on hold for a time interval; and
   unholding the call with the initiator communication device.

5. The method of claim 1,
   wherein the call is one of:
   a voice call, or a video call,
   wherein the voice call is one of:
   a circuit switched (CS) call, or
   a packet switched (PS) call, and
   wherein the video call is a PS video call.

6. The method of claim 1, wherein the target communication device receives the call with the RTT from the initiator communication device.

7. A target communication device configured to:
   receive a call from an initiator communication device;
   receive, from the initiator communication device, information for the call in case that the target communication device does not answer the call during a predetermined time interval;
   transmit, to a network, a first message including a real time text (RTT) tag, the first message indicating support of a RTT of the target communication device;
   receive, from the network, a second message including the RTT tag, the second message indicating support of the RTT of the initiator communication device; and
   respond to the call with the RTT based on the information for the call and the second message, wherein at least one character entered by the target communication device in the RTT is displayed instantaneously on the initiator communication device.

8. The target communication device of claim 7, wherein the target communication device is further configured to respond to the call with the RTT by:
   accepting the call received from the initiator communication device, wherein the call is accepted independent of establishment of a call session; and
   responding to the call with the RTT after accepting the call, wherein the RTT is sent to the initiator communication device when call is on hold.

9. The target communication device of claim 7, wherein the target communication device is further configured to respond to the call with the RTT by:
   rejecting the call from the initiator communication device; and
   responding to the call with the RTT.

10. The target communication device of claim 7, wherein the target communication device is further configured to respond to the call with the RTT by:
    accepting the call received from the initiator communication device, wherein the call is accepted independent of establishment of a call session;
    responding to the call with the RTT after accepting the call, wherein the RTT is sent to the initiator communication device when call is on hold for a time interval; and
    unholding the call with the initiator communication device.

11. The target communication device of claim 7,
    wherein the call is one of:
    a voice call, or
    a video call,
    wherein the voice call is one of:
    a circuit switched (CS) call, or
    a packet switched (PS) call, and
    wherein the video call is a PS video call.

12. The target communication device of claim 7, wherein the target communication device is further configured to receive the call with a RTT from the initiator communication device.

13. An initiator communication device configured to:
   transmit a call from an initiator communication device,
   transmit, to a target communication device, information for the call in case that the target communication device does not answer the call during a predetermined time interval;
   receive, from a network, a first message including a real time text (RTT) tag, the first message indicating support of a RTT of the target communication device;
   transmit, to the network, a second message including the RTT tag, the second message indicating support of the RTT of the initiator communication device; and
   initiate the call with the target communication device by including the RTT in the call, wherein at least one character entered by the target communication device in the RTT is displayed instantaneously on the initiator communication device.

14. The initiator communication device of claim 13, wherein the initiator communication device is further configured to initiate the call after receiving a RTT from the target communication device.

15. The initiator communication device of claim 13,
   wherein the call is one of:
      a voice call, or
      a video call,
   wherein the voice call is one of:
      a circuit switched (CS) call, or
      a packet switched (PS) call, and
   wherein the video call is a PS video call.

16. A non-transitory computer readable storage medium configured to store one or more computer programs including instructions that, when executed by at least one processor, cause the at least one processor to control for:
   receiving a call from an initiator communication device;
   receiving, from the initiator communication device, information for the call in case that a target communication device does not answer the call during a predetermined time interval;
   transmitting, to a network, a first message including a real time text (RTT) tag, the first message indicating support of a RTT of the target communication device;
   receiving, from the network, a second message including the RTT tag, the second message indicating support of the RTT of the initiator communication device; and
   responding to the call with the RTT based on the information for the call and the second message, wherein at least one character in the RTT is sent instantaneously to the initiator communication device.

17. A method of initiating to a call with a text by an initiator communication device, the method comprising:
   transmitting a call from an initiator communication device;
   transmitting, to a target communication device, information for the call in case that the target communication device does not answer the call during a predetermined time interval;
   receiving, from a network, a first message including a real time text (RTT) tag, the first message indicating support of a RTT of the target communication device;
   transmitting, to the network, a second message including the RTT tag, the second message indicating support of the RTT of the initiator communication device; and
   initiating the call with the target communication device by including the RTT in the call, wherein at least one character entered by the target communication device in the RTT is displayed instantaneously on the initiator communication device.

18. The method of claim 17, further comprising:
   initiating the call after receiving the RTT from the target communication device.

19. The method of claim 17,
   wherein the call is one of:
      a voice call, or
      a video call,
   wherein the voice call is one of:
      a circuit switched (CS) call, or
      a packet switched (PS) call, and
   wherein the video call is a PS video call.

* * * * *